US006487557B1

(12) United States Patent
Nagatomo

(10) Patent No.: US 6,487,557 B1
(45) Date of Patent: Nov. 26, 2002

(54) NETWORK-ACCESS MANAGEMENT SYSTEM AND METHOD APPLIED TO NETWORK AND COMPUTER PROGRAM PRODUCT INCLUDING COMPUTER PROGRAM RECORDED ON STORAGE MEDIUM FOR CREATING DISPLAY DATA

(75) Inventor: Shoichi Nagatomo, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/218,279

(22) Filed: Dec. 22, 1998

(30) Foreign Application Priority Data

Dec. 26, 1997 (JP) .............................. 9-361538
Dec. 26, 1997 (JP) .............................. 9-361539
Mar. 18, 1998 (JP) ............................. 10-067531

(51) Int. Cl.[7] .............................................. G06F 17/00
(52) U.S. Cl. ........................................ 707/102; 707/3
(58) Field of Search ................... 707/1–3, 10, 100–103

(56) References Cited

U.S. PATENT DOCUMENTS 5,899,995 A * 5/1999 Miller et al. ................. 707/102
5,905,498 A * 5/1999 Diament ....................... 345/356
6,208,995 B1 * 3/2001 Himmel et al. .............. 707/104

FOREIGN PATENT DOCUMENTS

WO    WO 97/15889 A    5/1997
WO    WO 97/41673 A    11/1997

OTHER PUBLICATIONS

T. Kamba et al, "Anatagonomy: a personalized newspaper on the World Wide Web", International Journal of Human––Computer Studies, vol. 46, pp. 789–803 (Jan. 1, 1997).
E. Ayers et al, "Using Graphic History in Browsing the World Wide Web", International World Wide Web Conference, World Wide Web Journal, pp. 451–459 (Dec. 1, 1995).
M. Crossley et al, "Three–Dimensional Internet Developments", BT Technology Journal, vol. 15, No. 2, pp. 179–193 (Apr. 1, 1997).

* cited by examiner

Primary Examiner—James P. Trammell
Assistant Examiner—Mary Wang
(74) Attorney, Agent, or Firm—Frishauf, Holtz, Goodman & Chick, P.C.

(57) ABSTRACT

In a network-access management system, addresses of pages which at least one client terminal has accessed in the past are stored in a history table in association with user ID information. When a connection request from the client terminal is detected, display data according to the access frequency and type of the addresses stored in the history table and the performance of the client terminal is created, anchors for the addresses (or object images having an anchoring function) are pasted into the display data, and the display data thus created is sent to the client terminal. The client terminal displays the display data. When a user select the anchors, the client terminal is connected to the information associated to the anchor through the network-access management system and the network.

17 Claims, 32 Drawing Sheets

FIG.4

121 CLIENT USER INFORMATION TABLE

| CLIENT USER ID INFORMATION | CLIENT USER NAME | PASSWORD | LAYOUT TYPE | DOCUMENT TYPE |
|---|---|---|---|---|
| aaaa | A | USER1 | CLASSIFICATION ACCORDING TO TYPE | VRML |
| bbbb | B | USER2 | CLASSIFICATION ACCORDING TO ACCESS FREQUENCY | HTML |

FIG.5

122 HISTORY TABLE

| CLIENT USER ID INFORMATION | ADDRESS | LATEST ACCESS DATE AND TIME | ACCESS FREQUENCY |
|---|---|---|---|
| aaaa | www.A1.co.jp/A1.html | 970105/220130 | 1 |
| aaaa | A1@ccc.co.jp | 970105/230205 | 3 |
| aaaa | www.A2.co.jp/A2.html | 970106/060300 | 85 |
| bbbb | | | |

FIG.6

123 YELLOW PAGE TABLE

| URL | TYPE | SUBTYPE | ... |
|---|---|---|---|
| http://www.A1.co.jp/A1.html | SHOPPING | CAR | |
| http://www.A2.co.jp/A2.html | SHOPPING | FOOD | |
| ⋮ | | | |
| A1@ccc.co.jp | MAIL | PRIVATE INDIVIDUAL | |

FIG.7

124 OBJECT IMAGE TABLE

| TYPE | SUBTYPE | OBJECT IMAGE DATA |
|---|---|---|
| SHOPPING | CAR | c: ¥ image ¥ shopping ¥ car.gif |
| SHOPPING | FOOD | c: ¥ image ¥ shopping ¥ food.gif |
| MAIL | PRIVATE INDIVIDUAL | |

FIG.8

125 MAP TABLE

| CLIENT USER ID INFORMATION | MAP DATA |
|---|---|
| 0001 | 0001.html |
| 0002 | 0002.wrl |
| 0003 | 0003.wrl |
| ⋮ | | car. gif food. gif

FIG.22

1121 CLIENT USER INFORMATION TABLE

| CLIENT USER ID INFORMATION | CLIENT USER NAME | PASSWORD | LAYOUT TYPE | DOCUMENT TYPE | OBSERVATION INTERVAL | PREVIOUS OBSERVATION DATE AND TIME |
|---|---|---|---|---|---|---|
| 0001 | A | USER1 | CLASSIFICATION ACCORDING TO TYPE | VRML | 2 | 970108/220005 |
| 0002 | B | USER2 | CLASSIFICATION ACCORDING TO ACCESS FREQUENCY | HTML | 3 | 970105/210000 |

FIG.23

1122 HISTORY TABLE

| CLIENT USER ID INFORMATION | ADDRESS | LATEST ACCESS DATE AND TIME | ACCESS FREQUENCY | STATUS |
|---|---|---|---|---|
| 0001 | www.A1.co.jp/A1.html | 970105/220130 | 1 | UPDATED |
| 0001 | A1@ccc.co.jp | 970105/230205 | 3 | — |
| 0001 | www.A2.co.jp/A2.html | 970106/060300 | 85 | BUSY |
| 0002 | | | | NOT FOUND |

FIG.24

1124 OBJECT IMAGE TABLE

| TYPE | SUBTYPE | STATUS | OBJECT IMAGE DATA |
|---|---|---|---|
| SHOPPING | CAR | NORMAL | c: ¥ image ¥ shopping ¥ car1.gif |
| | | UPDATED | c: ¥ image ¥ shopping ¥ car2.gif |
| | | BUSY | c: ¥ image ¥ shopping ¥ car3.gif |
| | | NOT FOUND | c: ¥ image ¥ shopping ¥ car4.gif |
| | | : | |
| SHOPPING | FOOD | | |

FIG.32

2121 CLIENT USER INFORMATION TABLE

| CLIENT USER ID INFORMATION | CLIENT USER NAME | PASSWORD | LAYOUT TYPE | TERMINAL SPEC ||||| 
| --- | --- | --- | --- | --- | --- | --- | --- | --- |
| | | | | CPU | MEMORY | LINE | DISPLAY COLOR | DISPLAY SIZE |
| 0001 | A | USER1 | CLASSIFICATION ACCORDING TO TYPE | P-150 | 48 | 33.6 | 16 BIT | 800×600 |
| 0002 | B | USER2 | CLASSIFICATION ACCORDING TO ACCESS FREQUENCY | P-133 | 32 | 64 | 256 | 1024×768 |
| ‥ | | | | | | | | |

NETWORK-ACCESS MANAGEMENT SYSTEM AND METHOD APPLIED TO NETWORK AND COMPUTER PROGRAM PRODUCT INCLUDING COMPUTER PROGRAM RECORDED ON STORAGE MEDIUM FOR CREATING DISPLAY DATA

BACKGROUND OF THE INVENTION

1. Field of the Invention

The present invention relates to a network-access management system and method applied to an information transmitting/receiving server which intervenes between a network like the WWW or the like and a client terminal operated by a user, and a computer program product including a server-executable computer program recorded on a storage medium.

2. Description of the Related Art

1. Explanation of WWW

Of late, a kind of network service such as referring to or creating WWW pages on the Internet has become popular, due to which application software and books, etc. teaching how to crate WWW pages have been widely distributed.

WWW is the acronym of the World Wide Web which is a worldwide information network using the Internet.

A WWW page is a unit of information which is a constituent of a Web document stored in a given WWW server on the WWW. A WWW page is a structured document described in HTML (Hypertext Markup Language) or SGML (Standard Generalized Markup Language) or recently in XML (Extensible Markup Language) into which HTML and SGML has been integrated. Image data formatted in GIF (Graphic Interchange Format) or according to JPEG (Joint Photographic Experts Group) can be pasted on a WWW page to be transmitted Recently, a more dynamically expressed WWW page, formed by accessing a CGI (Common Gateway Interface) loaded in a WWW server or by employing an applet described in a programming language Java (Sun Microsystems), and a WWW page described in VRML (Virtual Reality Modeling Language) for drawing a 3-D graphic on the WWW in real time, have also appeared.

A WWW browser receives data for permitting such WWW pages to be displayed on a client terminal from a Web site, interprets the data and displays the data on the screen of a computer which is executing the WWW browser.

A WWW page or a structured document described in HTML or SGML can contain two-dimensional information such as a text, a drawing, a moving picture, sounds, etc. A WWW page or a structure document described in VRML can integrally contain three-dimensional information.

Owing to VRML, a client user can view three-dimensionally displayed objects from various angles, and can also have an experience such as walking a real-world city displayed as a map in which the objects are laid out arbitrarily.

In general, a method for displaying such a map or a method for displaying information sent from the WWW is known as a cyberspace or a virtual real space.

Due to the above-described function, a client user can view or listen to the information laid open worldwide on a home page, simply by operating his/her terminal, and can also send a page created by himself/herself to all parts of the world.

In normal cases, a structured document, an image, an audio, etc., which are data for enabling the display of the aforementioned page, are stored in a WWW server on the WWW in the state wherein the data has been classified according to user ID information (information such as user accounts, HTTP/IP addresses, etc.) used to operate individual client terminals.

The users who operate client terminals include private individuals, governments, companies and other organizations, etc.

Each user can create hierarchically structured pages by employing a language for creating structured documents.

Of hierarchically structured pages, the particular page which is located in the highest level in the hierarchy is defined as the "home page."

Each user, who has made hierarchically structured pages, can create links by describing, on the home page, URLs for some pages. One page as the link destination can have a link to another page.

URLs (Uniform Resource Locators) are addresses for identifying individual pages on the Internet. URLs are expressed like "http://www.xxx.co.jp/index.html" and "http://www.xxx.co.jp/index.wrl", for example, and designate the corresponding pages of HTML and VRML documents.

Normally a link on a page is displayed in the form known as "anchor."

An anchor on a page displayed by the WWW browser is a symbol (an image or the like which indirectly expresses the address and contents of the link destination page) which represents the link destination page.

In the case of structured documents, they can have mutually related anchors.

For example, a HTML document can have a link to a VRML document, while the VRML document can have a link to the HTML document.

When a user who uses the WWW browser clicks with a mouse on the symbol which indicates the desired link destination, the WWW browser displays the link destination page (that is, the user jumps to the link destination). The user can jump not only to a page in a lower level in the hierarchy but also to a page in a higher level in the hierarchy, as well as to a page on another web site.

On the page currently displayed by the WWW browser, when the user clicks on the symbol which indicates another page, the WWW browser displays the indicated page. On the page as displayed, when the user clicks on the symbol which indicates another page, the WWW browser displays the page as indicated. In this manner, the WWW browser can display subsequent pages from one to another.

At that time, the WWW browser accesses the WWW server specified by the URL corresponding to a clicked symbol, normally via a provider and the Internet, and downloads the target data from a Web site stored in the WWW server to either a memory or storage device of the computer which is executing the WWW browser.

After completing data download or simultaneously with data download, the WWW browser displays the data as a page on the display of the computer.

Currently, Netscape Navigator from Netscape Communications Corporation, Internet Explorer from Microsoft Corporation, etc. are available as WWW browsers and are now being used widely.

2. Explanation of VRML

In order to display a VRML document, the corresponding VRML viewer needs to be prepared. A dedicated browser different from the WWW browsers such as Netscape Navigator, etc., or a VRML plug-in module or helper application of the WWW browsers offers such a VRML viewer.

As explained previously, VRML is a language used to define a three-dimensional space and object on the WWW.

By manipulating human-type avatars belonging to an object class, the users can walk the VRML virtual space (a walk-through) or can make communications with each other in the manner known as a chat, for example.

By setting a camera to a scene in the virtual space, the point of view can be determined through the camera.

VRML was born in 1994, specification VRML 1.0 was formalized in 1995, and the latest specification is VRML 2.0.

There is a considerable difference between those two specifications. With VRML 1.0, a time stopped three-dimensional scene with no sounds can only be created.

With VRML 2.0, however, a scene such as one in which a placed object starts moving suddenly or a color change occurs upon clicking can be created. Using VRML 2.0, a dynamic world with a music can be realized.

Furthermore, in the actual VRML viewer, the avatars and the camera are moved generally by indicating their positions directly with a mouse click or by operating buttons for their forward and backward movements and rotations with a mouse click.

3. Explanation of Bookmark

In addition to a referring method, like "Internet surfing", of changing a displayed page from one to another in order that a user can refer to the desired page, a method of such a type as typing an URL directly in a location designation area on the GUI (Graphical User Interface) screen displayed by the WWW browsers or the VRML viewer is available in the case where the URL of the page to be displayed is known beforehand.

However, some users may refer to pages for stock price information and news every day.

When a user needs to thus refer to a fixed certain page every time, it would be inconvenient and inefficient for him/her to type an URL consisting of several-ten characters every time.

In consideration of the above, in order to facilitate page display, the WWW browsers, etc. generally have a "bookmark" function.

The bookmark function is that of pre-registering any favorite web site or and page to be accessed frequently in client terminals which are connected via the WWW browsers and the VRML viewer, etc.

A user can utilize this function by the procedures of pre-registering the URLs of to-be-displayed pages as bookmark data items, displaying a list of pages pre-registered bookmarks and selecting the desired page from the list with a mouse click or the like.

By virtue of the use of the above function, the user is released from the inconvenience of typing the URL, and can display and refer to the desired page without a loss of time due to any typing error.

FIG. 1 illustrates a typical bookmark display screen 3000 displayed by a certain WWW browser.

As shown in the illustration, the bookmarks can be hierarchically managed, and a collection of bookmarks 3111 can be managed with being filed in a single folder 3110. By so doing, the bookmarks 3111 can be put in order, with the bookmarks being classified according to category, thus enabling the user to find the desired one of the bookmarks 3111 even in the case where the number of bookmarks 3111 is large.

Referring to the bookmark display screen 3000 illustrated in FIG. 1, for example, a "BOOKMARK" folder 3100 is located as the top-level file, and a "WWW SEARCH ENGINE" folder 3110 located below it contains yellow pages "goo" and "Yahoo! JAPAN" registered as the bookmarks 3111. As illustrated in FIG. 1, those bookmarks 3111 are displayed as a list upon clicking on the "WWW SEARCH ENGINE" folder 3110 with a mouse.

FIG. 1 also illustrates other bookmarks 3111, such as "IBM Patent Server Home Page", which are not contained in the folder 3110.

As titles for identifying the bookmarks 3111 like "goo" and "Yahoo! JAPAN" mentioned above, the titles set by the persons who made the pages corresponding to those bookmarks are used as they are.

A user, who operates the WWW browsers and the VRML viewer, can select and display the desired page with ease by double-clicking a mouse at the line showing one bookmark 3111 such as "goo", or by clicking the mouse at the line showing another bookmark 3111 on a pop-up window (not illustrated) which displays bookmarks 3111 other than those displayed on the bookmark display screen 3000.

When the user displays the desired page for the first time by typing its URL in the location designation area on the screen displayed by the WWW browsers or the VRML viewer, or when the user discovers the desired page via the aforementioned Internet surfing or the like, the user can add the bookmark 3111 of the desired page by selecting "addition of bookmarks" with a mouse click or the like while the desired page is being opened.

At that time, information including the URL and title of the page is registered automatically as a bookmark 3111, and the title of the page is used as is as the title of the registered bookmark 3111.

The user can add a new bookmark 3111 to the desired folder 3110 also during the display of the bookmark display screen 3000 illustrated in FIG. 1, by typing an URL, a title, etc. with an operation for adding new bookmarks 3111.

The user can edit information pertaining to the bookmarks 3111 on a bookmark editing screen (not illustrated) which is displayed by selecting, with the mouse, the property of the target bookmark 3111 on the bookmark display screen 3000 illustrated in FIG. 1.

The user can also delete or remove the target bookmark 3111 itself (including removal from one folder to another folder) on the bookmark display screen 3000 illustrated in FIG. 1, by operating the mouse or the like.

4. Explanation of Electronic Mail

Individuals or companies or other organizations frequently send and receive electronic mails (e-mails) via network like the aforementioned Internet.

The e-mails are transferred between e-mail servers installed on the network. A user (an individual or the like) sends an e-mail to another person or receives an e-mail directed to himself/herself via an e-mail server.

In the case of an Internet e-mail, the e-mail address is provided normally in a format such as "user@xxx.or.jp" or the like.

The e-mails include not only Internet e-mails but also e-mails exchanged between personal computers or between computers installed in other organizations and companies. Those e-mails are exchanged through gateways, etc.

Various application tools (called "mailers") for sending and receiving such e-mails, for example, an application tool put on sale as a set with the WWW browsers, a mail-dedicated application tool, are available at present.

As regards the basic function of sending and receiving e-mails, however, the mailers do not differ from each other depending on their developers.

Having established a connection with the network, users activate the mailers to receive the e-mails directed to themselves.

In receiving the e-mails, the users can classify those e-mails into different folders in accordance with the senders of the e-mails and the contents of the subjects of the e-mails.

In sending the e-mails, the users can easily designate the mail addresses pre-stored in their respective "address books", as the destinations of the e-mails, by performing a mouse click or the like. Thus, the users can designate the e-mail addresses with ease and need not type them each time they send the e-mails.

Needless to say, the users have to type the e-mail addresses when sending the e-mails to destinations to which the users have sent no e-mails before. However, if the users register the e-mail addresses at that time, they can easily designate the e-mail addresses when sending the e-mails to the aforementioned destinations next time as mentioned above, and need not type the e-mail addresses.

Moreover, the e-mail addresses stored in the address books are storable in a plurality of folders, as in the case of the bookmarks of the WWW browsers, etc.

Consequently, a hierarchical management such as that performed utilizing the bookmarks is also possible. For example, the mail addresses of friends and company associated mail addresses can be managed with being distinguished from each other. In an e-mail management within a company, the mail addresses can be classified according to department or branch office.

In order to permit an ordinary user to access a resource on the network such as the Internet for the purpose of referring to the WWW pages or sending/receiving an e-mail, the client terminal (computer) operated by the user needs to be connected via a public line or the like to a server called a provider which constantly has points of connections to the Internet.

By so doing, the user can access the resource on the network such as the Internet through the server of the provider, and can transfer a page and an e-mail to his/her own computer.

5. Drawbacks

Due to the bookmark function of the conventional WWW browsers and VRML viewer, users can cause the WWW browsers and the VRML viewer to display the desired page by selecting the bookmark of the desired page with a mouse or the like, without having to input a long URL every time in association with the page.

However, once the bookmark of the page has been registered, the conventional WWW browsers and VRML viewer never change the bookmark location or the structure of the bookmark unless the users operate t hem on purpose.

For example, the bookmark for a frequently accessed (used) page may be located on the inconspicuous lowermost part of the bookmark display screen, or the page may located at such a low level in hierarchy that the users cannot reach the page without opening many folders one after another.

Furthermore, the conventional WWW browsers and VRML viewer do not automatically classify pages according to whether the pages have been accessed in the past or to what genre the pages belong, which results in troublesome selecting operations having to be performed by the users to select the bookmark for the desired page among a number of bookmarks.

The address books of the mailers which deal with e-mails entail the same drawbacks as the above-described drawbacks of the conventional WWW browsers and VRML viewer.

SUMMARY OF THE INVENTION

It is accordingly an object of the present invention to provide a network-access management system, method and a computer program product including a computer readable program recorded on a computer usable medium, for unitarily managing the addresses of pages accessed by the WWW browsers and the VRML viewer, as well as the e-mail addresses of e-mails received and sent by the mailers, and for creating display data showing the aforementioned addresses, in order to eliminate the above-described drawbacks.

It is another object of the present invention to provide a network-access management system and method for automatically laying out images corresponding to the addresses or updating the display data, in accordance with the frequency of client terminal's accesses to the pages or the frequency of e-mail transmissions and receptions, etc.

According to one aspect of the present invention having the aforementioned objects, there is provided a network-access management system, which connects at least one client terminal and a network having information resources, and which performs information transmissions between the at least one client terminal and the network, the system comprising:

first storage means for storing addresses of information pieces which the at least one client terminal has accessed in the past;

analyzing means for analyzing attributes of the addresses stored in the first storage means;

creating means for creating display data which reflects a result of the analysis performed by the analyzing means; and sending means for sending the display data created by the creating means to the at least one client terminal.

With the above-described structure, the network-access management system can create display data reflecting the attributes, for example, the frequency of accesses which the user of the at least one client terminal has gained with respect to the addresses in the past, and can provide the at least one client terminal with the created display data.

The aforementioned attributes of the addresses include at least one of the types of the addresses such as e-mail addresses or URLs, the types of information such as e-mails or WWW pages to which the addresses have been assigned, and the frequency of accesses to the addresses. With this structure, the display data is arranged or modified based on the types of address, the types of the information or the frequency of access to the addresses. For example, the network-access management system can arrange the addresses, which the client-user accessed, on the display data based on the frequency or the type. Therefore, the user can understand the access status at a glance.

The aforementioned display data is map data representing a map in which anchors for the addresses stored in the first storage means are laid out. With this structure, the anchors for the address to which the user accessed, are arranged and displayed like a map. Therefore, the user can select and access information resources easily. Namely, an effective or a user oriented user interface can be obtained.

The network-access management system may further comprise: second storage means for storing display data sent in the past to the client terminal, and means for changing the display data stored in the second storage means to the display data created by the creating means.

According to the above structure, the network-access management system stores the display data. Thus, the client terminals need not to store the display data. Further, even if the user uses aplurality of client terminals, the display data is transmitted to each of the client terminals.

Therefore, the memory capacities of the client terminals can be saved, and most recently updated display data can be presented to the user.

The network-access management system may further comprise: second storage means for storing display data sent in the past to the at least one client terminal; checking means for checking the display data stored in said second storage means with the display data created by said creating means, thereby determining a change in the display data stored in said second storage means; and means for reflecting the change determined by said checking means in the display data created by said creating means. With this structure, the created display data is further modified or arranged based on the determined change. Therefore, the display data can incorporate, for example, the history of changes such as updates of the information, open and close of the information resources, and changes of the addresses. Thus, the user can understand the statuses of the addresses to which the user accessed.

The network-access management system may further comprise: third storage means for storing, in association with the addresses, images which serve as anchors for the addresses; and means for reading out the images stored in the third storage means, based on the addresses stored in the first storage means, and for pasting the readout images into the display data created by the creating means. With this structure, the anchors are displayed as the images with which the address are associated. Therefore, the user can catch the addresses such as an e-mail address and a URL at a glance.

The images are preferably ones for characterizing the information pieces stored in said addresses.

The network-access management system may further comprise: accessing means for periodically accessing the addresses stored in the first storage means; first determining means for determining statuses of the information pieces stored in locations specified by the addresses which the accessing means has accessed; and first altering means for altering the display data in accordance with a result of the determination performed by the first determining means.

With the above-described structure, the network-access management system can provide the at least one client terminal with the display data in accordance with the statuses of the information pieces stored in the locations specified by the addresses which the at least one client terminal has requested to access.

Therefore, the user can see the updated statuses of the information resources corresponding to the addresses.

The images are preferably ones for characterizing the contents of the statuses.

The network-access management system may further comprise: accessing means for periodically accessing the addresses stored in the first storage means; second determining means for determining statuses of the network when permits the accessing means to access the addresses; and second altering means for altering the display data in accordance with a result of the determination performed by the second determining means.

With the above-described structure, the network-access management system can provide the at least one client terminal with the display data in accordance with the statuses of the network having the information pieces stored at the addresses which the at least one client terminal has requested to access. Therefore, the user can understand the statuses, such as traffics, of the network through which the user accessed the information, when the user connects the client terminals to the access management system.

The images are preferably ones for characterizing the information pieces.

The network-access management system may further comprise: sixth storage means for storing information on at least a display performance of the at least one client terminal; and third altering means for altering the display data, based on at least the display performance stored in the sixth storage means, when the display data is sent to the at least one client terminal. With the above-described structure, the network-access management system can provide the at least one client terminal with the display data in accordance with the performance of the at least one client terminal. Therefore, the client terminal with any capability can display the display data. The user can select any desired client terminal from a number of candidates of the client terminal.

The network may be WWW, and said display data may be structured document data described in VRML. According to this structure, the history of connection to WWW can be displayed visually and three-dimensionally. Therefore, the user can easily understand the history.

According to another aspect of the present invention having the aforementioned objects, there is provided a network-access management method for dealing with information transmissions between at least one client terminal and a network having information resources the method comprising:

a storing step of storing addresses of information pieces which the at least one client terminal has accessed in the past;

an analyzing step of analyzing attributes of the stored addresses;

a creating step of creating display data to be displayed on the at least one client terminal, in accordance with a result of the analysis; and a sending step of sending the created display data to the at least one client terminal.

By employing the above-described method, the network-access management system can create display data reflecting, for example, the frequency of accesses which the user of the at least one client terminal has gained with respect to the addresses in the past, and can provide the at least one client terminal with the created display data.

According to another aspect of the present invention having the aforementioned objects, there is provided a computer program product which is applied to a network-access management method for information transmissions between at least one client terminal and a network having resources of information pieces to which addresses have been assigned, the computer program product including a computer readable program recorded on a computer usable medium, for creating display data to be sent to the at least one client terminal, the computer readable program executing:

a storing step of storing the addresses of the information pieces which the at least one client terminal has accessed in the past;

an analyzing step of analyzing attributes of the stored addresses;

a creating step of creating the display data to be displayed on the at least one client terminal, in accordance with a result of the analysis; and a sending step of sending the created display data to the at least one client terminal.

The above-described computer program product enables the network-access management system to have the function of making the at least one client terminal display the display data reflecting, for example, the frequency of accesses which the user of the at least one client terminal has gained with respect to the addresses in the past.

Further, the computer program may be embedded in the in a carrier wave which transfers the program and data through a network.

BRIEF DESCRIPTION OF THE DRAWINGS

FIG. 4 is a diagram exemplifying the file format of a client user information table 121 in the client database 120;

FIG. 5 is a diagram exemplifying the file format of a history table 122 in the client database 120;

FIG. 6 is a diagram exemplifying the file format of a yellow page table 123 in the client database 120;

FIG. 7 is a diagram exemplifying the file format of an object image table 124 in the client database 120;

FIG. 8 is a diagram exemplifying the file format of a map table 125 in the client database 120;

FIG. 22 is a diagram exemplifying the file format of a client user information table 1121 in the client database of the second embodiment;

FIG. 23 is a diagram exemplifying the file format of a history table 1122 in the client database of the second embodiment;

FIG. 24 is a diagram exemplifying the file format of an object image table 1124 in the client database of the second embodiment;

FIG. 32 is a diagram showing the file format of a client user information table 2121 in the client database of the second embodiment;

DETAILED DESCRIPTION OF THE PREFERRED EMBODIMENT

First Embodiment

Figure 1:
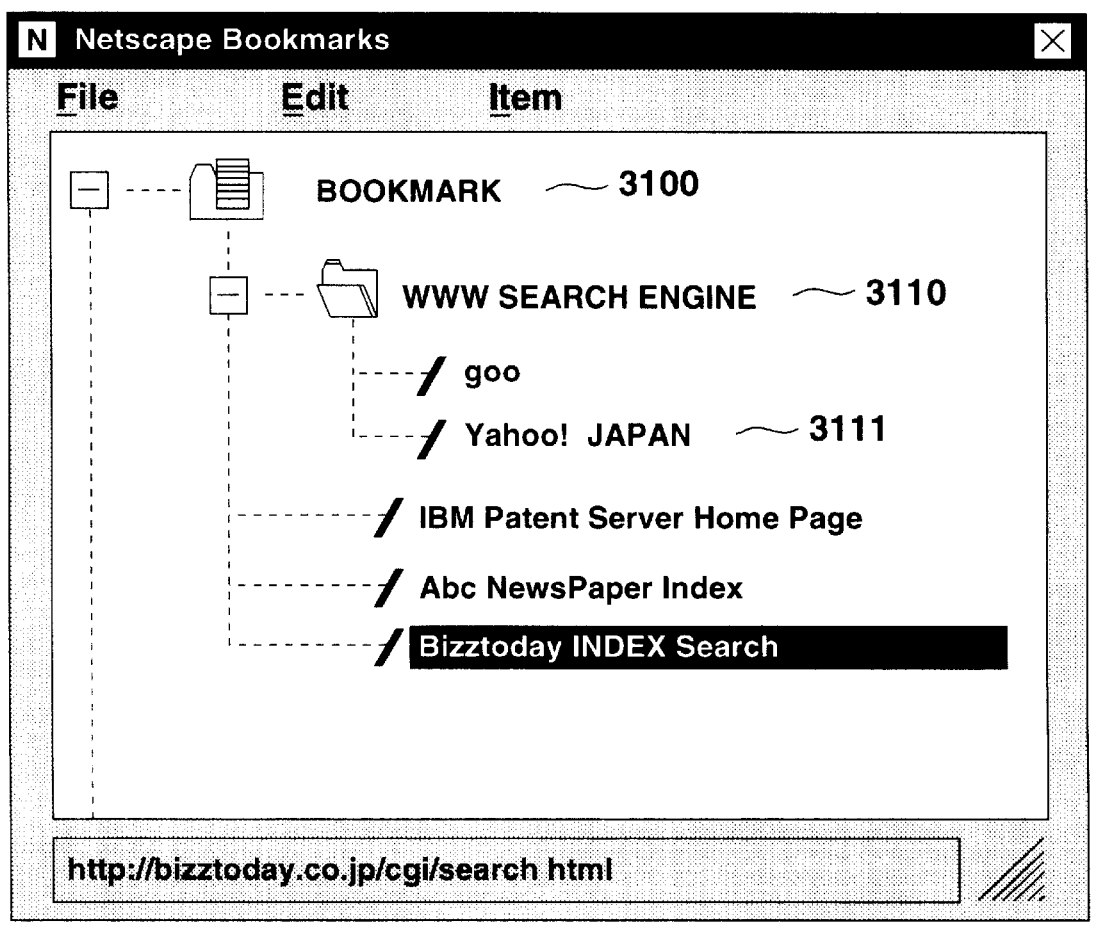
FIG. 1 is a diagram showing a bookmark display screen which is displayed on a client terminal when a known WWW (World Wide Web) browser is executed.

The first embodiment of the present invention will now be described with reference to the accompanying drawings. Like reference numerals denote like parts throughout the drawings.

Figure 2:
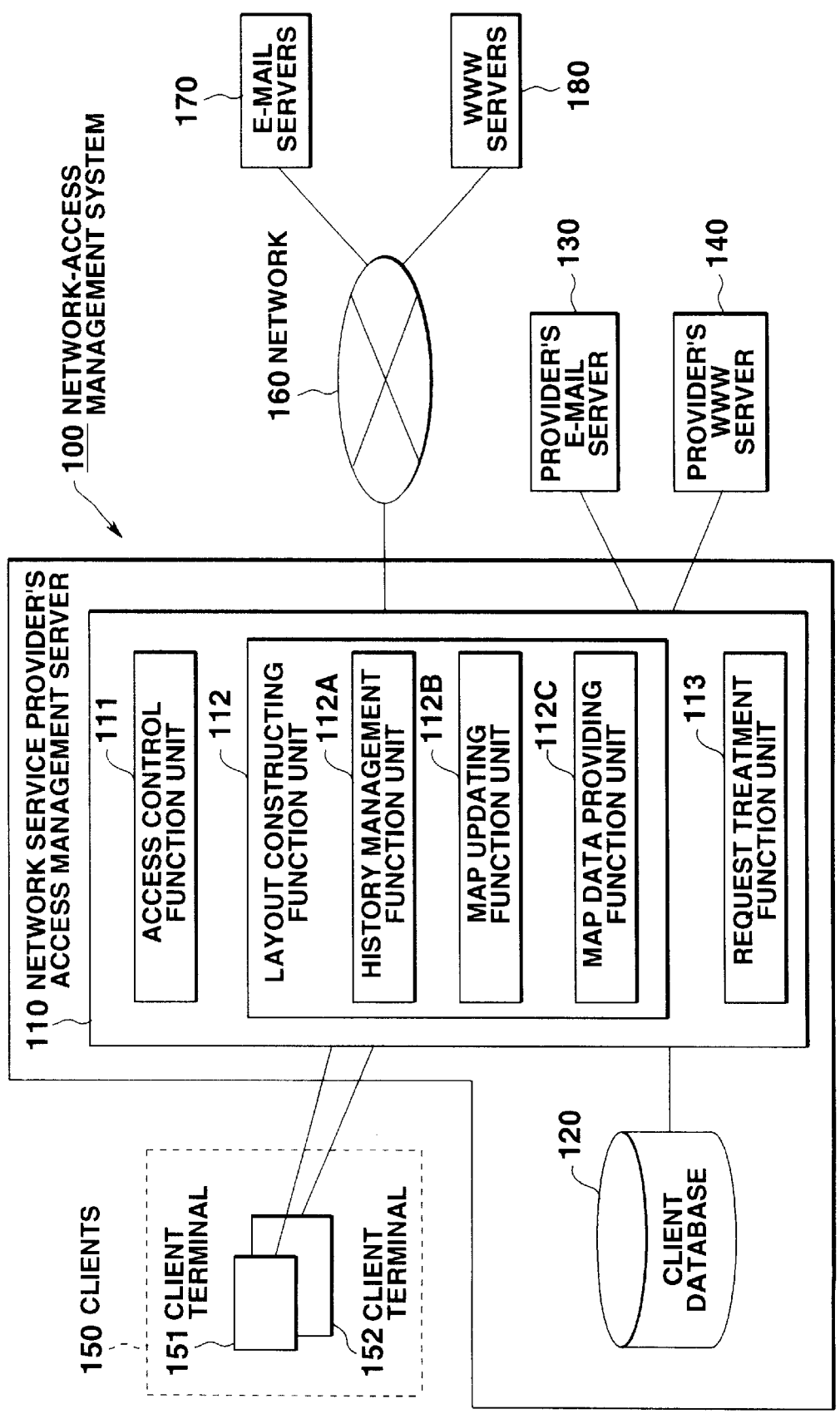
FIG. 2 is a system block diagram illustrating a network-access management system 100 according to the first embodiment of the present invention.

FIG. 2 is a system block diagram illustrating the network-access management system 100 according to the first embodiment of the present invention.

The network-access management system 100 includes a network service provider's access management server 110, and a client database 120.

The provider's access management server 110 has an access control function unit 111, a layout constructing function unit 112 and a request treatment function unit 113.

The provider's access management server 110 is connected to a provider's e-mail server 130 and a provider's WWW server 140 when needed.

Clients 150, used by client users who have subscribed to a network service (e-mail service, WWW browsing service . . . etc) provided by the provider's access management server 110, include client terminals 151 and 152, etc.

When accessing resources on the network 160, the users connect the client terminals 151 and 152 to the provider's access management server 110 via public lines or the like.

In embodiments (the first embodiment and the second and third embodiments which will be described later) of the resent invention, the client terminals 151 and 152 are apparatuses which can be connected to the provider's access management server 110 via existing wire/wireless communication lines.

For example, the client terminals 151 and 152 are apparatuses like (desk-top type or notebook type) personal computers with modems, PDA (Personal Digital Assistance), cellular phones having a data communication function and a display function, and electronic apparatuses having the data communication function and the display function.

A network 160 is one like the Internet which is accessible by an indefinite number of people. However, the network 160 is not limited thereto, and may include a company LAN, a WAN, a VAN, an intranet, an extranet, or any other specific network whose users are limited.

E-mail servers 170 and WWW servers 180 comprehensively represent e-mail servers and WWW servers other than the subject network service explained herein.

Upon receiving connection requests through public lines or the like from the client terminals 151 and 152 operated by the users, the access control function unit 111 checks the ID information and passwords of the users. Having finished the authentication, the access control function unit 111 establishes a connection between the provider's access management server 110 and each of the client terminals 151 and 152 so that the users can access the Internet, etc.

The layout constructing function unit 112 includes a history management function unit 112A (history management means), a map updating function unit 112B (layout data updating means) and a map data providing unit 112C (layout data providing means).

The provider's access management server 110 updates map (layout) data to display addresses (URLs, e-mail addresses, etc.) which have been accessed by the users in the past on the client terminals 151 and 152 as three-dimensional representations which can be selected with ease, in place of the bookmark registration function of the WWW browsers and the address book registration function of the mailers.

This map data is the "original" map data based on which the three-dimensional representations are displayed on the client terminals 151 and 152, and is, in fact, structured document data described in HTML or VRML.

Displaying the addresses on the client terminals 151 and 152 on the basis of the map data will be hereinafter referred to as the "map display."

The history management function unit 112A stores, in association with pieces of user ID information, the addresses of the WWW pages which have been accessed by the users in the past and the addresses of the e-mails which have been sent and received by the users in the past.

At the time the users access the WWW pages or send/receive e-mails, the history management function unit 112A checks whether the addresses of the WWW pages and the e-mail addresses have been utilized by the users in the past.

The map updating function unit 112B updates the map data for three-dimensionally displaying the addresses of the WWW pages which have been accessed by the user in the past and the addresses of the e-mails which have been sent and received by the user in the past, in accordance with the conditions of the users' accesses to the WWW pages and the sending and receiving conditions of the e-mails.

The map data providing unit 112C sends the map data to the client terminals 151 and 152 when the users have accessed the WWW pages and have sent/received the e-mails by operating the client terminals 151 and 152, or when the users have connected the client terminals 151 and 152 to the provider's access management server under contract.

The request treatment function unit 113 operates in accordance with users' requests sent from the client terminals 151 and 152 connected to 110 network service provider.

For example, the request treatment function unit 113 downloads structured document data of the WWW pages and other associated data (image data, audio data) through the network 160 from the WWW servers 180 having predetermined addresses, and sends the downloaded data to the client terminals 151 and 152. Furthermore, the request treatment function unit 113 sends and receives thee-mails as requested by the users.

The access control function unit 111 and the request treatment function unit 113 have functions which a conventional network service has provided to them by employing conventional software.

Figure 3:
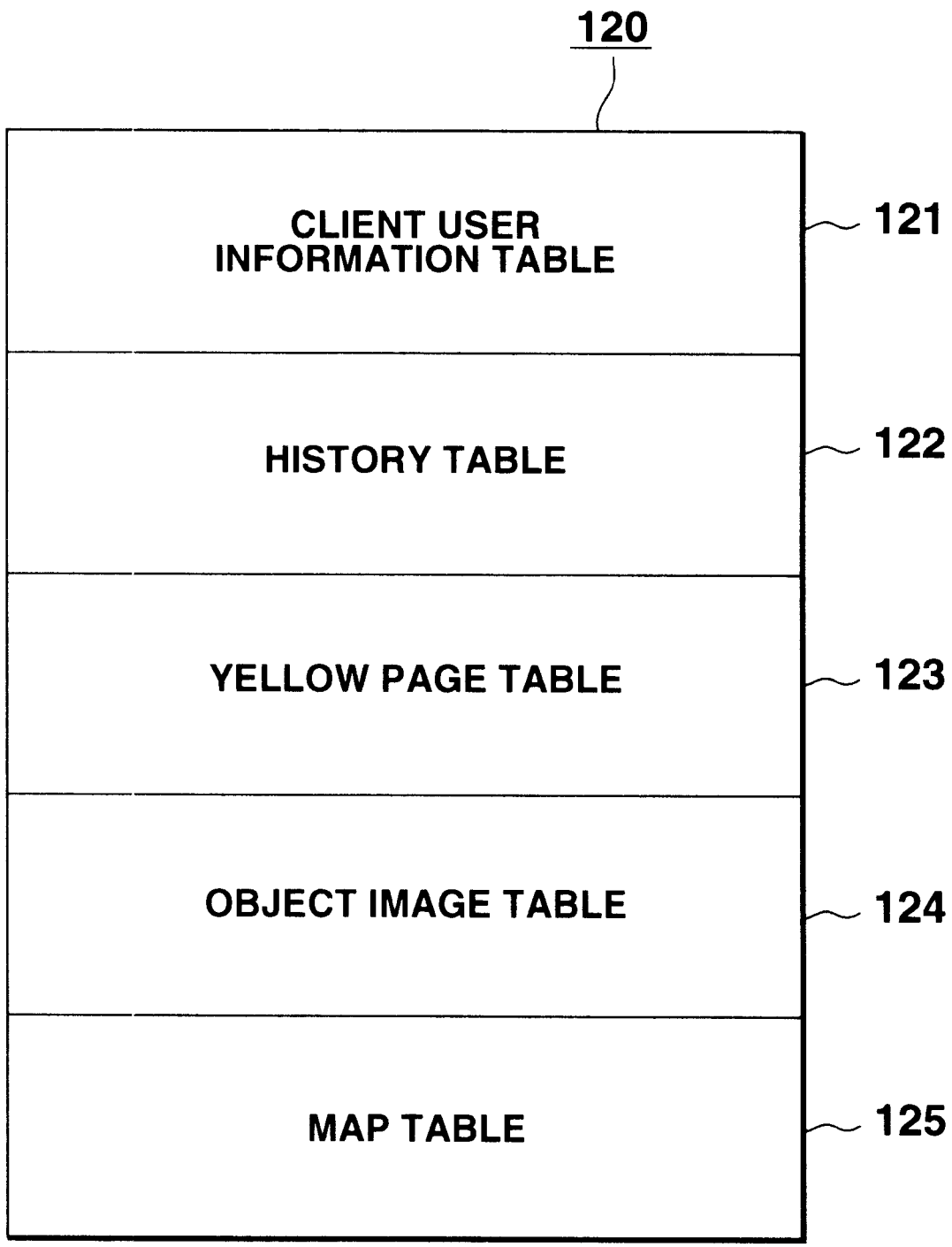
FIG. 3 is a diagram showing the storage contents of tables included in a client database 120.

As illustrated in FIG. 3, the client database 120 connected with the provider's access management server 110 includes a client user information table 121, a history table 122, a yellow page table 123, an object image table 124 and a map table 125. Each table will be described later in detail.

The provider's e-mail server 130 stores an e-mail which has been sent to a user, who has made a service contract with the network service provider, from another network service provider via the network 160. When the provider's e-mail server 130 receives an e-mail transfer instruction from, for example, the client terminal 151 which is operated by such a user, the provider's e-mail server 130 transfers the received e-mail to, for example, the client terminal 152 designated as the transfer destination of the e-mail.

The provider's WWW server 140 stores the structured document data created by the network service provider and the user who has made a service contract with the network service provider, and any other necessary data, modules, etc.

The users access those data via public lines by operating the client terminals 151 and 152.

Meanwhile, other users who are not under a service contract with the network service provider access the above data via public lines and the network 160.

In general, the network service provider has a WWW server which provides a cache function and a security function for accessing the WWW pages. However, no explanations will be made to the PROXY server herein.

The e-mail servers 170 and the WWW servers 180 comprehensively represent e-mail servers and WWW servers other than the subject network service provider explained herein.

FIGS. 4 to 9 show the contents of the tables and data stored in the client database 120.

FIG. 4 exemplifies the file format of the client user information table 121. In the illustration, the client user information table 121 has the columns "client user ID information", "client user name", "password", "layout type" and "document type."

The columns "client user ID information", "client user name" and "password" are those which have been conventionally managed by the network service. When the users attempt connecting the client terminals 151 and 152 to the network service provider's access management server 110 by operating those terminals, the access control function unit 111 checks whether the users are authorized to connect them to the network service provider.

The column "layout type" specifies the type in which the map data is to be created.

In this example, three layout types "classification according to the types of addresses", "classification according to access frequency" and "change object image display according to access frequency" are available.

The document types are structured document data types in which the map data to be displayed on the client terminals 151 and 152, which are operated by the users, is created. An appropriate application (a plug-in, a viewer) is selected depending on the structured document data types.

The map data is interpreted by the above application, and a map having the bookmark function and the address book function is displayed on the client terminals 151 and 152.

In this example, languages such as HTML and VRML are employed. However, any other language or method can also be employed insofar as the function of anchoring to WWW pages, etc. can be realized.

FIG. 5 exemplifies the file format of the history table 122. In the illustration, the history table 122 has the columns "client user ID information", "address", "latest access date and time" and "frequency."

The addresses include the URLs of the WWW pages accessed by the users identified by the client user ID information and the addresses of the e-mails received and sent by the users.

The latest access dates and times are the dates and times of the latest accesses to the aforementioned addresses.

The frequencies represent the number of times the users have accessed the aforementioned addresses within a predetermined period of time.

The history table 122 is designed so that when the same client user accesses the same address, the date and time of the latest access to the record corresponding to that address are updated and no new record is added.

However, a new record may be added at the time of an access or the like, and records having the same address may be counted when frequency information is necessary.

FIG. 6 exemplifies the file format of the yellow page table 123. In the illustration, the yellow page table 123 has the columns "URL", "type" and "subtype." The column "type" specifies the types of the contents to be displayed, while the column "subtype" specifies the more specific subtypes of the contents to be displayed.

The URLs of the WWW pages existing on the Internet and the mail addresses of individuals or companies are pre-stored in the yellow page table 123.

Furthermore, the yellow page 123, the contents to be displayed when the users access the aforementioned addresses are classified into some categories (general groups) called types and are further classified into more specific categories (subgroups) called subtypes.

For example, the first record in FIG. 6 shows that the category "shopping" is the type of the content to be displayed when accessing the WWW page having the URL "http://www.A1.co.jp/A1.html", while the category "car" is the subtype of the content, from which it can be understood that the above URL is associated with the shopping of a car.

The to-be-displayed contents may be classified only into categories called types, or may be further classified into a larger number of categories.

It is preferred that the yellow page table 123 be one which has been determined in advance by the network service provider's access management server 110 or another organization.

FIG. 7 exemplifies the file format of the object image table 124. In the illustration, the object image table 124 has the columns "type", "subtype" and "object image data."

The columns "type" and "subtype" in the object image table 124 correspond to those of the yellow page table 123 described previously. A combination of a type and a subtype corresponds to one image data item (a combined key, i.e., a combination of a type and a subtype serves as a unique key).

For example, the first record in FIG. 7 shows that a combination of the type "shopping" and the subtype "car" corresponds to the image data item "c:¥image¥shopping¥car.gif."

The image data referred to in FIG. 7 is GIF data. However, the image data may include any other data, which can represent images such as animation GIF, BMP files, etc.

In the case where VRML, coordinates data, etc. which define the stereoscopic or three-dimensional representation of a display image are also stored, although such data are not exemplified in this embodiment.

FIG. 8 exemplifies the file format of the map table 125 that stores the client user ID information and the map data in association with each other.

This map data is the "original" map data based on which the map display is performed on the client terminals 151 and 152. The map data as stored (HTML documents, VRML documents or any other documents/methods) differs depending on the document type s specified in the client user information table 121 and according to what type of display the users designate. In the case of the description language HTML, the file extension is expressed as "html", while in the case of the description language VRML, the file extension is expressed as "wrl", as shown in FIG. 8.

Figure 9A:
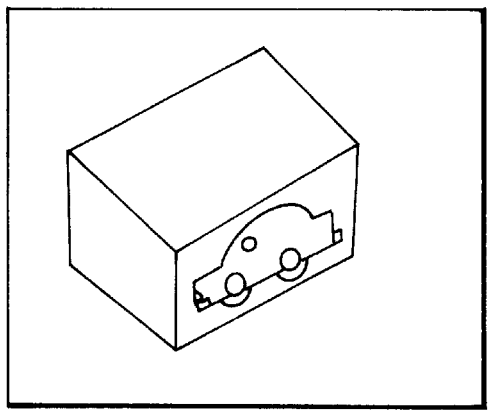
FIGS. 9A and 9B are diagram s illustrating examples of image data stored in the object image table 124.
Figure 9B:
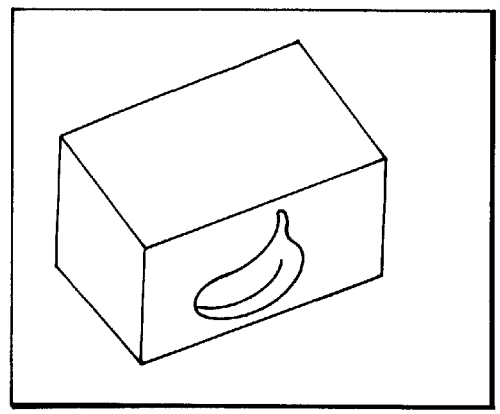

FIGS. 9A and 9B illustrate examples of image data stored in the object image table 124 and displayed as images on an appropriate editing screen.

In the illustration, the images displayed on the editing screen are object images in GIF.

FIG. 9A corresponds to the shopping of a car, while FIG. 9B corresponds to the shopping of food.

It is preferred that the images be associated with the to-be-displayed contents.

The procedures which are carried out by the provider's access management server 110 will now be described in detail, with reference to the flowcharts illustrated in FIGS. 10 to 12.

Figure 10:
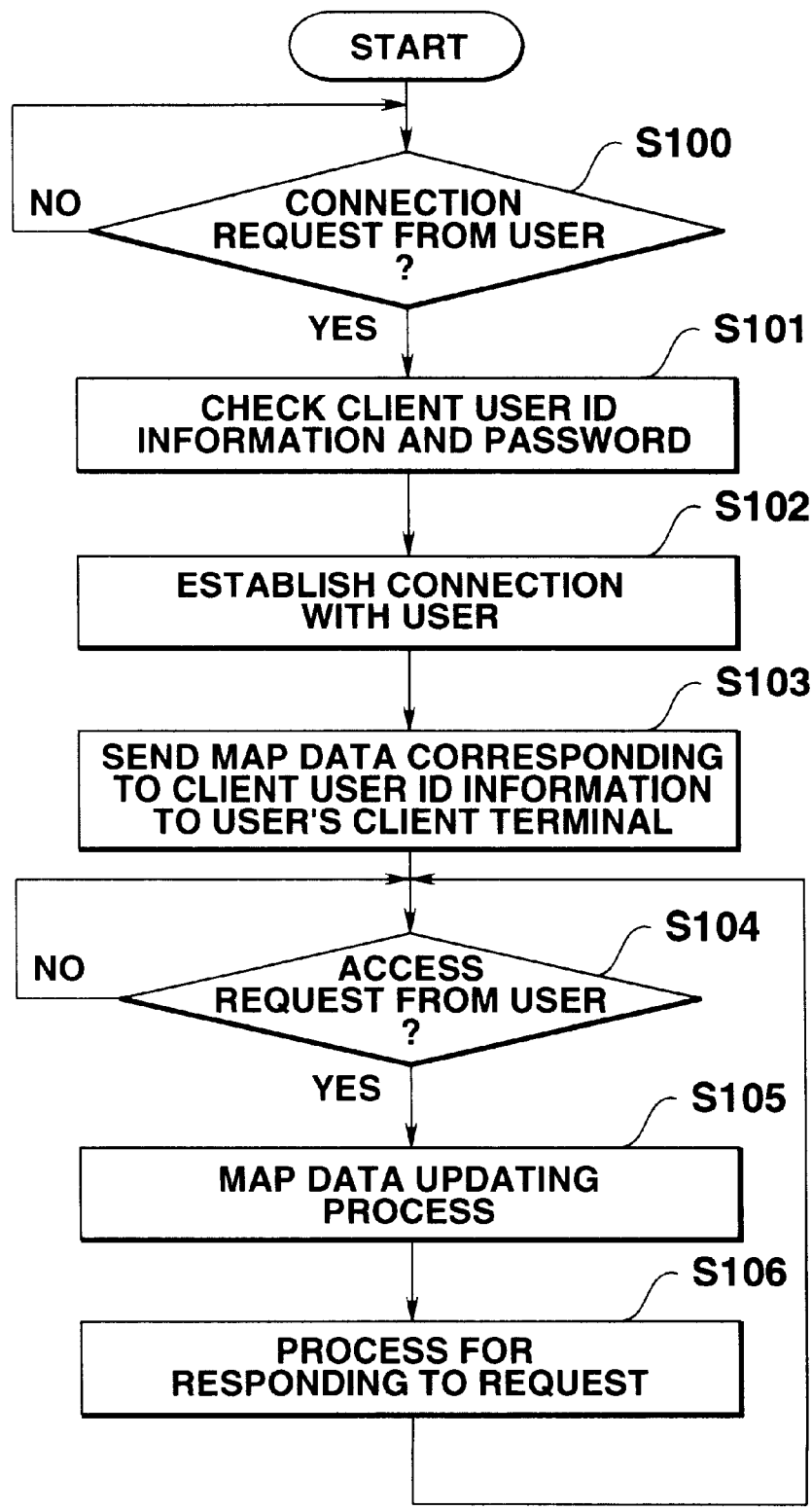
FIG. 10 is a flowchart showing the entire procedures which are executed by a network service provider's access management server 110.

FIG. 10 shows the flow of the procedures which are carried out by the provider's access management server 110 when a user connects the client terminal 151 to the network 160 service provider by operating the client terminal 151 and thereafter accesses a resource on the network 160.

Firstly in a step S100, the provider's access management server 110 waits for a connection request from the client terminal 151 which is operated by the user.

When the provider's access management server 110 determines that the connection request has been received ("Yes" in the step S100), it checks the client user ID information and the password of the user in a step S101.

When the provider's access management server 110 determines that no connection request has been received ("No" in the step S100), it repeats the determination in the step S100.

In the step S101, the provider's access management server 110 compares the password input by the user with the password which corresponds to the client user ID information in the client user information table 121. When there is no coincidence between both passwords, the provider's access management server 110 refuses the connection of the client terminal 151.

When the client user ID information and the password are proper, the provider's access management server 110 goes to a step S102, in which the provider's access management server 110 authenticates that the user or the connection requester is an authorized client user, and establishes a session between the provider's access management server 110 and the client terminal 151 of the user.

Next the provider's access management server 110 goes to a step S103, in which the provider's access management server 110 sends the map data corresponding to the client user ID information of the session-established user and data necessary for displaying the map data, from the map table 125 to the client terminal 151 of the user.

At that time, in the case where there is any e-mail which has not been read by the user in the provider's e-mail server 130, the provider's access management server 110 affixes information concerning the e-mail to the map data in order to inform the user of the presence of the e-mail which has not been read by the user, and then sends the map data to the user.

In a step S104, the provider's access management server 110 determines whether the user has issued a request for an access to a resource on the network 160.

When the provider's access management server 110 determines that the user has not issued such an access request ("No" in the step S104), it repeats this determination.

The provider's access management server 110 may cut the connection with the client terminal 151 in the case where such an access request is not received while the provider's access management server 110 is repeating the determination within a predetermined period of time.

When such an access request is received from the user ("Yes" in the step S104), the provider's access management server 110 goes to a step S105.

In the step S105, the provider's access management server 110 updates the map data which the map table 125 stores in association with the user, in accordance with the content of the user's access.

In a step S106, the provider's access management server 110 carries out a process for dealing with a user's request.

This process is the same as that carried out by a conventional provider.

To be specific, this process includes all procedures carried out with respect to the resource on the network 160, such as accessing to a WWW page, sending/receiving the e-mail, downloading data from an WWW site, etc.

The steps S105 and S106 may be carried out in the reverse order, or may be conducted simultaneously. When the provider's access management server 110 finishes the step S106, it returns to the step S104 and waits for an access request from any user again.

Figure 11:
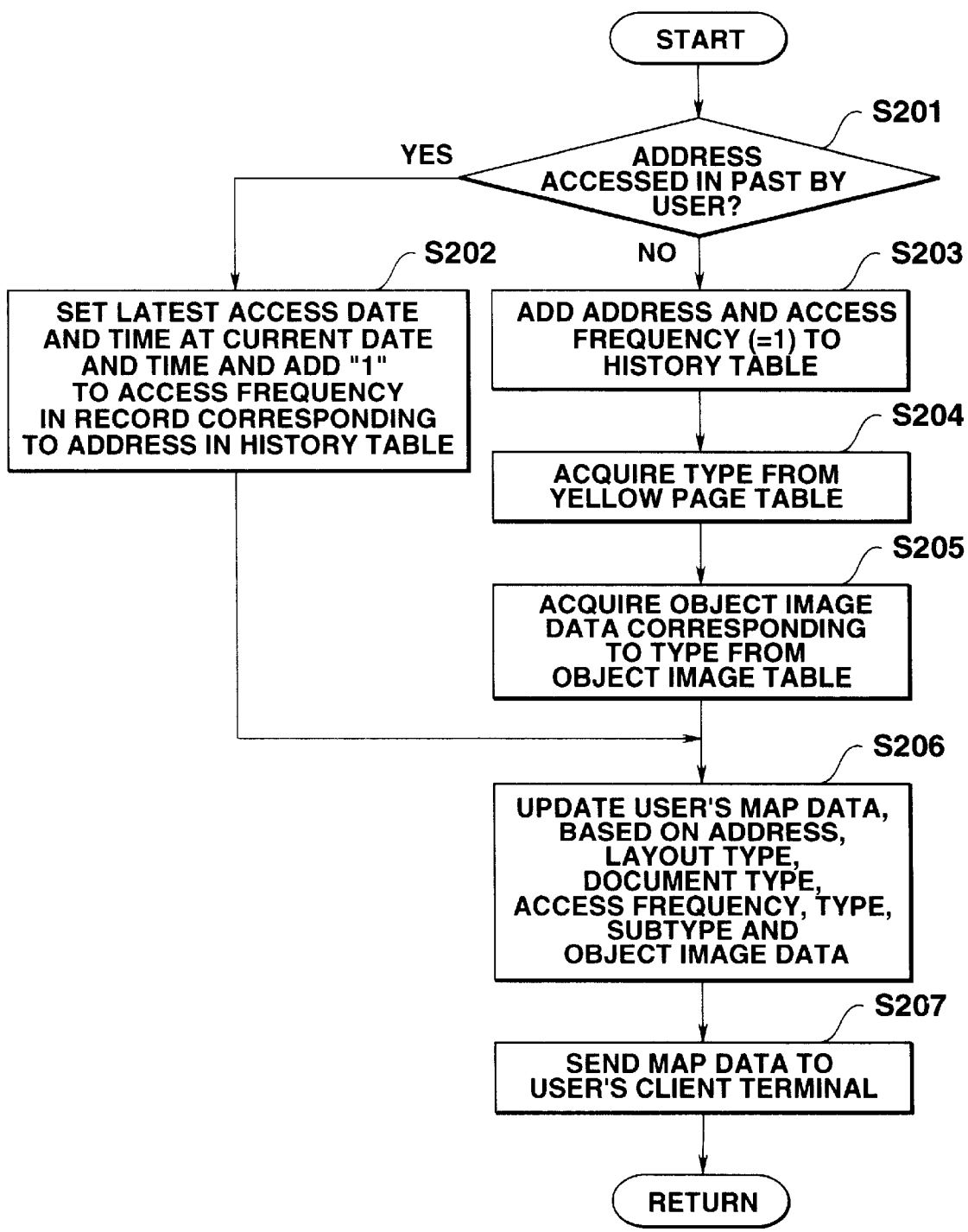
FIG. 11 is a flowchart showing a map data updating process which is carried out by the provider's access management server 110.

FIG. 11 explains in detail the map data updating process executed in the step S105 shown in FIG. 10.

Firstly in a step S201, the provider's access management server 110 determines whether the address to which the user has requested a connection is one accessed in the past by the user.

This determination is performed by searching addresses (URLs, e-mail addresses) which the history table 122 stores in association with the client user ID information of the user.

When the provider's access management server 110 determines that the address is one accessed in the past by the user ("Yes" in the step S201), it goes to a step S202, in which the provider's access management server 110 updates the record corresponding to the address in the history table 122, by setting the latest access date and time at the current date and time and by adding "1" to the frequency.

In the case where the provider's access management server 110 is designed so as to add a new record to the history table 122 each time an access is made, the provider's access management server 110 sets the address, the latest access date and time and the frequency (=1) to the new record and adds the new record to the history table 122. Thereafter, the provider's access management server 110 goes to a step S206.

When the provider's access management server 110 determines in the step S201 that the address is not one accessed in the pas t by the user ("No" in the step S201), it goes to the step S203, in which the provider's access management server 110 adds a new record which contains the address, the access date and time and the frequency (=1) to the history table 122.

Then the provider's access management server 110 goes to the step S204, in which the provider's access management server 110 acquires the type and subtype corresponding to the address from the yellow page table 123. In the case where the address is a personal e-mail address, there is the possibility that the address may not be found in the yellow page table 123. However, the provider's access management server 110 can identify the address as being a personal e-mail address by discriminating its format type (mail type, alias, post office, extension, etc.) and further discriminating its protocol type if necessary.

Furthermore, in the case where the address is not found in the yellow page table 123, the provider's access management server 110 may finally assign such an arbitrary object image as to suggest the fact that the address is not found in the yellow page table 123 to the image data corresponding to the address, or may cause the client terminal 151 to display a message showing the above fact.

Having acquired the type and subtype corresponding to the address from the yellow page table 123 in the step S204, the provider's access management server 110 acquires the corresponding image data from the object image table 124 in a step S205.

In the step S206, the provider's access management server 110 updates the user's map data, based on the accessed address, the corresponding layout type and document type in the client user information table 121, the frequency in the history table 122, the type and subtype in the yellow page table 123, and the image data acquired from the object image table 124 in the step S205.

The required data differs depending on the layout type in the client user information table 121, and all of the above-described data are not necessarily needed.

Having completed the update, the provider's access management server 110 stores the updated map data in the map table 125 and supplies (sends) the map data and the associated data to the client terminal 151 in a step S207.

By so doing, the client terminal 151 of the user, when he/she accesses a new address or when a change occurs in the access frequency, is supplied in real time with the map data which reflects those conditions, and the client terminal 151 performs the map display based on the supplied map data.

However, in the case where the user does not need such a frequent map data transmission, the provider's access management server 110 may send the map data only when the user accesses the provider.

Figure 12:
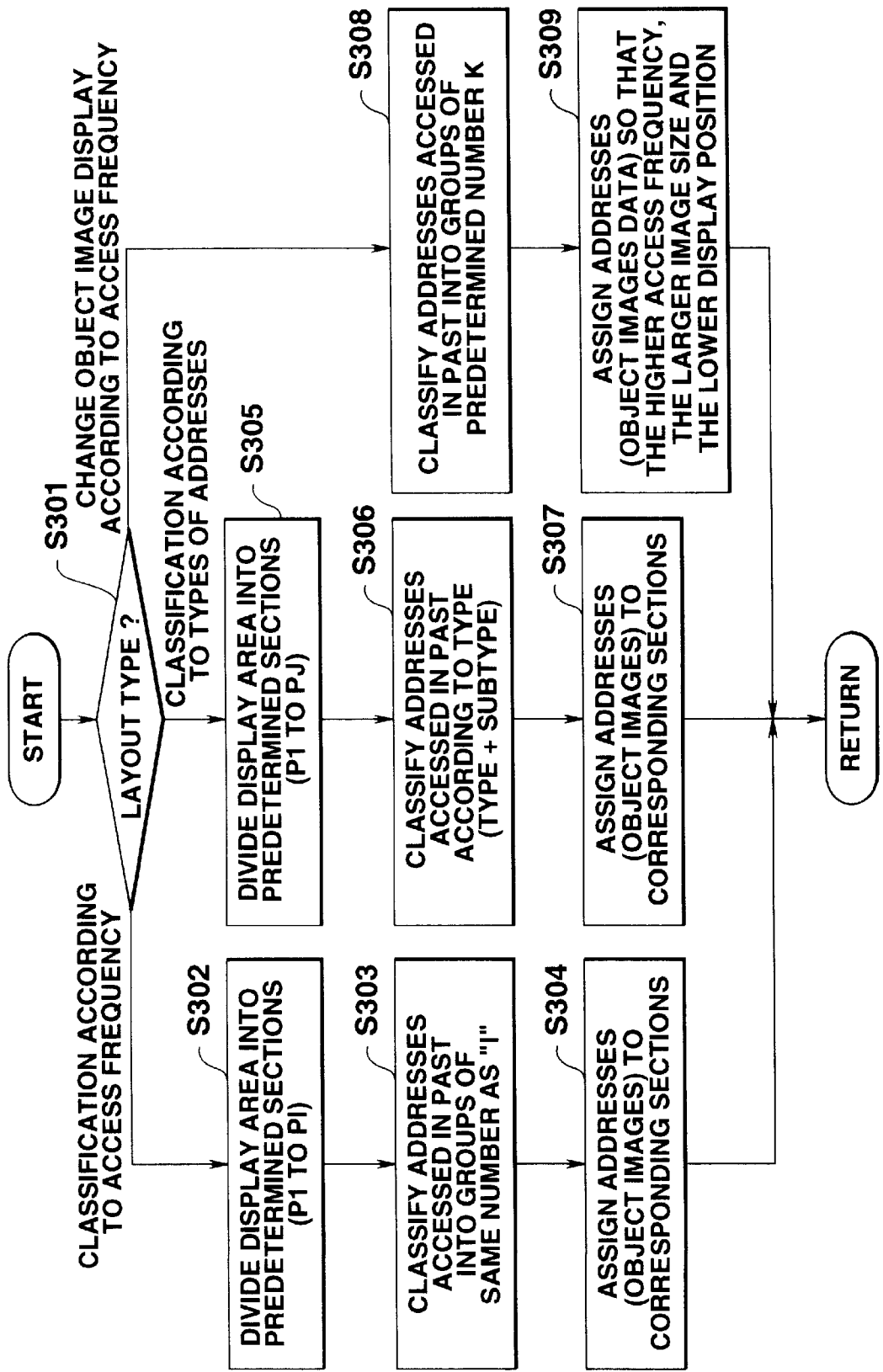
FIG. 12 is a flowchart showing the process for updating map data according to layout type in more detail.

FIG. 12 more specifically explains the map data updating process executed in the step S206 shown in FIG. 11. Firstly in a step S301, the provider's access management server 110 discriminates the layout types stored in the client user information table 121.

The map data updating step will be hereinafter explained assuming that the client user information table 121 stores three layout types "classification according to access frequency", "classification according to the types of addresses" and "change object image display according to access frequency."

If necessary, the layout types can be set by employing other criteria.

In the case of the layout type "classification according to access frequency", the flow of the control procedure follows the left-side branch so that the provider's access management server 110 executes a step S302.

In the step S302, the provider's access management server 110 divides the display area into predetermined sections (P1 to Pi).

This display area is one which is finally displayed on the client terminal 151. When considering the step S302 from the aspect of the creation of the to-be-displayed contents based on the structured document data, the step S302 is the procedure of creating a statement in each description language data so that the aforementioned sections (P1 to Pi) are displayed in accordance with the statement.

Then the provider's access management server 110 goes to a step S303, in which the provider's access management server 110 classifies the addresses which have been accessed in the past by the user into groups of the same number as "i".

For example, let it be assumed that the addresses A1 to A6 which have been accessed in the past by the user have access frequencies 1, 2, 3, 4, 5 and 6, respectively, in the case where the display area is divided into four sections (P1 to P4) and those sections are displayed as a display layout (display data).

In the above-described case, the highest access frequency 6 is divided by 4 (the result is 1.5). An address whose access frequency is 1.5 or less is grouped with the section P1, an address whose access frequency is higher than 1.5 but is not higher than 3.0 is grouped with the section P2, an address whose access frequency is higher than 3.0 but is not higher than 4.5 is grouped with the section P3, and an address whose access frequency is higher than 4.5 but is not higher than 6.0 is grouped with the section P4.

In consequence, one address having the access frequency 1 belongs to the section P1, two addresses having the access frequencies 2 and 3 belong to the section P2, one address having the access frequency 4 belongs to the section P3, and two addresses having the access frequencies 5 and 6 belong to the section P4.

Needless to say, the "classification according to access frequency" is not limited to the above-described linear classification, and other various ways of classification can be adopted.

In the step S304, the provider's access management server 110 assigns the addresses classified in the step S303 to their corresponding sections.

When considering the step S304 from the aspect of the creation of the to-be-displayed contents based on the structured document data, the step S304 is the procedure of designating the layout of the object images corresponding to the addresses grouped with the sections (P1 to Pi), in accordance with the statement created in each description language, so that the object images are arranged and displayed in the sections.

The object images are those acquired from the object image table 124, and are used in the case of performing display based on HTML, for example.

In the case of performing display based on VRML, the coordinates data, etc. (not illustrated) which define the stereoscopic or three-dimensional representation of a display image are acquired from the object image table 124, and the designation according to VRML is performed based on the acquired data.

By the procedures in the steps S302 to S304, the map data as a map in which the object images have been classified according to access frequency, is created.

This map data is the data described in HTML or VRML as shown in FIG. 8. The map data is sent to the client terminal 151 and is analyzed by the WWW browsers or the VRML viewer, after which the map which substitutes for bookmarks and address books is displayed on the client terminal 151.

When the provider's access management server 110 determines in the step S301 that the layout type is "classification according to the types of addresses", it goes the central branch to execute a step S305.

In the step S305, the provider's access management server 110 divides the display area into predetermined sections (P1 to Pj), as in the case of the step S302.

In the next step S306, the provider's access management server 110 classifies the addresses which have been accessed in the past by the user into groups, according to type and subtype.

As described previously, the types and subtypes of the addresses can be acquired from the yellow page table 123. The types and subtypes thus acquired are allotted to the sections P1 and Pj. However, the number of sections and the method of allotting the types and subtypes to the sections are arbitrary. For example, only the types may be allotted one to each of the sections, or combinations of the types and subtypes may be allotted one to each of the sections.

In the next step S307, the provider's access management server 110 assigns the addresses classified in the step S306 to their corresponding sections.

When considering the step S307 from the aspect of the creation of the to-be-displayed contents based on the structured document data, the step S307 is the procedure of designating the layout of the object images corresponding to the addresses grouped with the sections (P1 to Pj), in accordance with the statement created in each description language, so that the object images are arranged and displayed in the sections.

The object images are those acquired from the object image table 124, and are used in the case of performing display based on HTML, for example.

In the case of performing display based on VRML, the coordinates data, etc. (not illustrated) which define the stereoscopic or three-dimensional representation of a display image are acquired from the object image table 124, and the designation according to VRML is performed based on the acquired data.

By the procedures in the steps S305 to S307, the map data as a map in which the object images have been classified according to the types of the addresses, is created. This map data is the data written in HTML or VRML, as mentioned previously.

When the provider's access management server 110 determines in the step S301 that the layout type is "change object image display according to access frequency", it goes the right-side branch to execute a step S308.

In the step S308, the provider's access management server 110 classifies the addresses which have been addressed in the past by the user into groups of a predetermined number K.

In the next step S309, the provider's access management server 110 changes the sizes, colors, orientations and other features in appearance of the object images corresponding to the addresses, by a plurality of levels or stages of the same number (K) of groups into which the addresses have been classified. The provider's access management server 110 may change object image display not by the plurality of levels or stages (of the number K), but in proportion to access frequency.

An explanation will now be made to an example in which the higher access frequency an address has, the larger the corresponding object image is, and the more closer to the user the object image is displayed (the lower position in the display area the object image is displayed in).

When considering the step S309 from the aspect of the creation of data HTML and VRML, the step S309 is the procedure of designating the sizes and layout positions of the object images, depending on the number (K) of groups into which the addresses have been classified.

The object images are those acquired from the object image table 124, and are used in the case of performing display based on HTML, for example.

In the case of performing display based on VRML, the coordinates data, etc. (not illustrated) which define the stereoscopic or three-dimensional representation of a display image are acquired from the object image table 124, and the designation according to VRML is performed based on the acquired data.

By the procedures in the steps S308 and S309, the map data as a map in which the display of the object images has been changed according to access frequency, is created. This map data is the data written in HTML or VRML, as mentioned previously.

FIGS. 13 to 18 illustrate examples of the map displayed on the client terminal 151.

Figure 13:
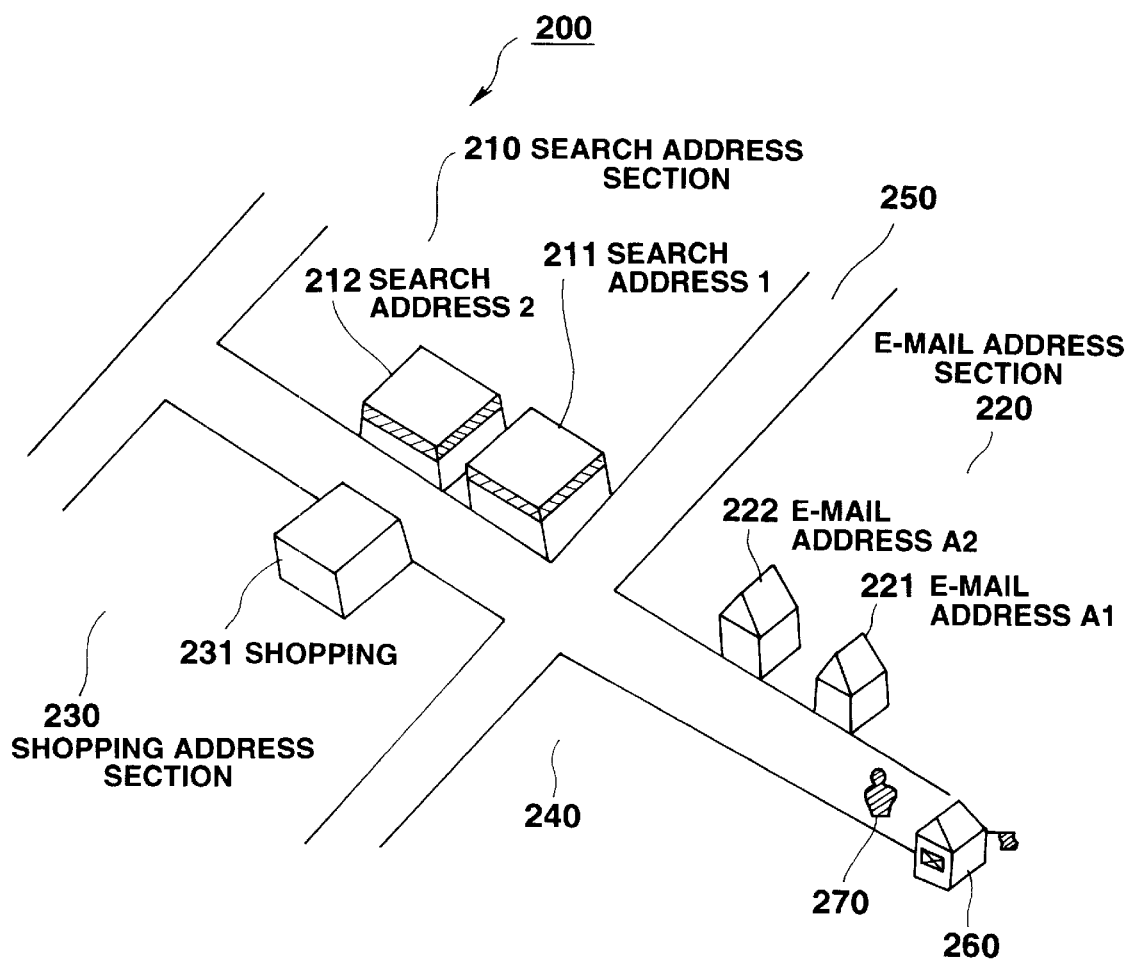
FIG. 13 is a diagram illustrating an example of a map which is displayed in the case of the layout type "classification according to the types of addresses" and language VRML.

FIG. 13 illustrates an example of the map displayed when the layout type shown in the client user information table 121 is "classification according to the types of addresses" and the corresponding document type is VRML. The displayed map 200 illustrated in FIG. 13 has four main sections 210, 220, 230 and 240, a road 250 between those sections, a home 260 and avatar 270.

The section 210, which has been set as one for addresses associated with a home page search, displays an object image 211 which corresponds to a search address 1 and an object image 212 which corresponds to a search address 2.

Those object images are stereoscopic or three-dimensional representations in the case of VRML, and their appearances change depending on the viewpoint of the avatar 270.

The section 220, which has been set as one for e-mail addresses, displays an object image 221 which corresponds to an e-mail address A1 and an object image 222 which corresponds to an e-mail address A2.

The section 230, which has been set as one for addresses associated with shopping, displays an object image 231 representing a certain shopping page. The section 240 is blank and displays no object images.

In the object image table 124, as described previously, different object images are assigned one to each of combinations of the types (general groups) and subtypes (more specific subgroups) of the addresses. For convenience of explanation, however, let it be assumed that different object images are assigned one to each of the types (general groups) of the addresses and are displayed as shown in the illustration of FIG. 13.

In this embodiment, therefore, three types of object images, i.e., the object images corresponding to search addresses, the object images corresponding to e-mail addresses and the object image representing a shopping page, are displayed.

However, the object image representing the home 260 is fixed.

In the example shown in FIG. 13, the addresses corresponding to the object images and the titles (e.g. titles of WWW pages) connected with the services to be supplied to the user if he/she accesses those addresses, are displayed together with leader lines. Those leader lines can be displayed in the state of being superposed on their corresponding object images, or can be displayed in any other state such as the state in which the leader lines are displayed in the vicinity of their corresponding object images.

The user controls the movement of the avatar 270 with a mouse or the like and goes to the desired address.

The avatar 270 ordinary starts from the home 260 and moves along the road 250. The camera position is fixed in this example. However, the camera can be arranged based on the view point of the avatar 270 so that the scene can be displayed in real time on a screen.

When the avatar 270 arrives the desired address and in the case where that address is the URL of a WWW page, a WWW browser (not illustrated) displays the WWW page. In the case where the address is an e-mail address, a mailer becomes activated and displays an e-mail editing screen (not illustrated) in the state wherein the e-mail address has been set as the transmission destination.

When the user wishes to perform a search on the displayed map, he/she can move the avatar 270 to the section 210 and select an appropriate URL (image data) in the section 210.

When the user wishes to refer to a page whose content is "shopping", he/she can go to the section 230 associated with shopping and find an appropriate URL (image data) in the section 230.

As mentioned previously, the home 260 has a flag which represents information showing the presence/absence of an unread e-mail(s). The flag is raised when there is an unread e-mail(s).

Such information may be presented by any other appropriate method.

Figure 14:
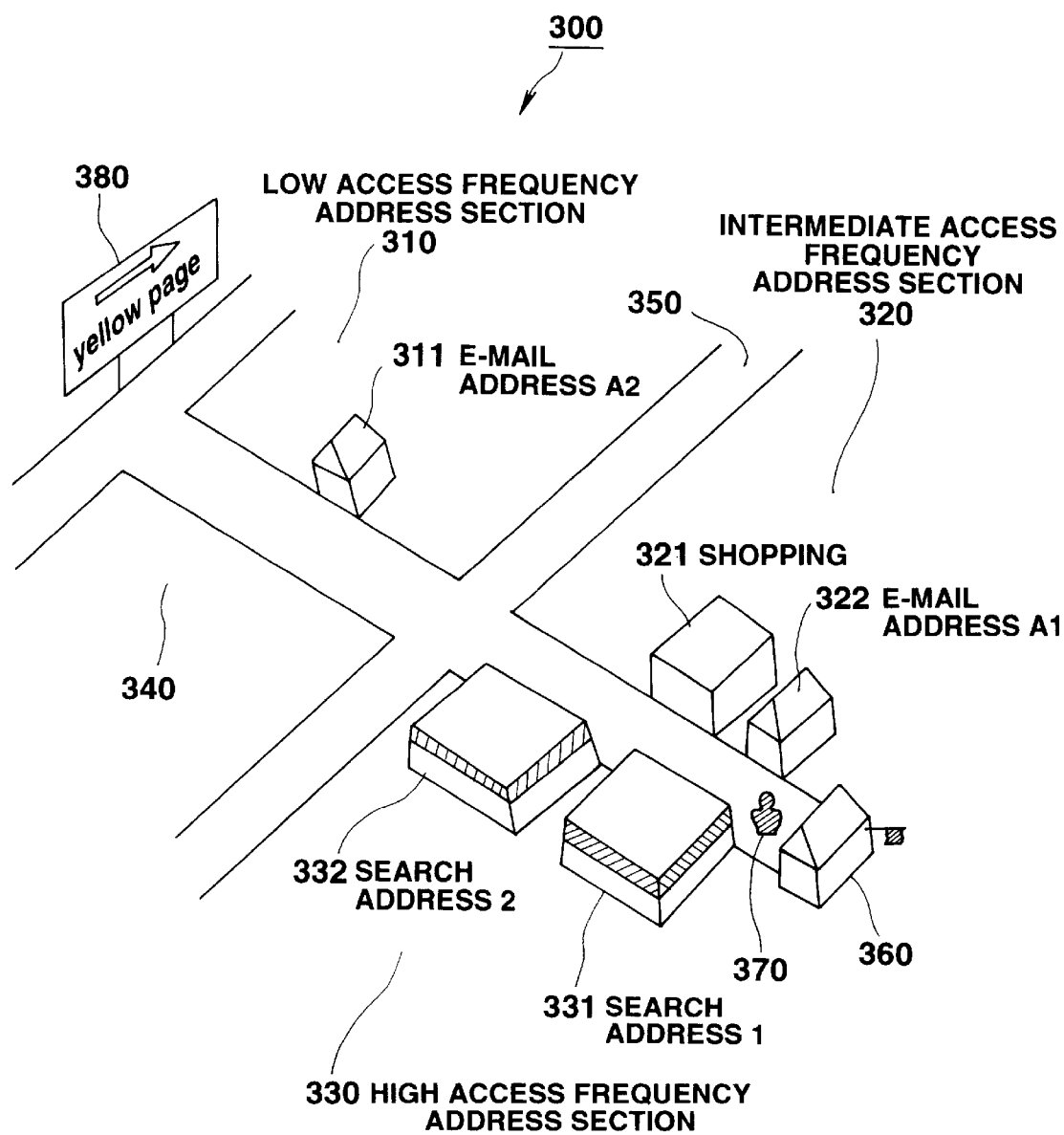
FIG. 14 is a diagram illustrating an example of a map which is displayed in the case of the layout type "classification according to access frequency" and language VRML.

FIG. 14 illustrates an example of the map displayed when the layout type shown in the client user information table 121 is "classification according to access frequency" and the corresponding document type is VRML.

The displayed map 300 illustrated in FIG. 14 has four main sections 310, 320, 330 and 340, a road 350 between those sections, a home 360 and avatar 370.

The section 310, which has been set as one for addresses having a low access frequency, displays an object image 311 which corresponds to an e-mail address A2.

The section 320, which has been set as one for addresses having an intermediate access frequency, displays an object image 321 which corresponds to the address (URL) of a shopping page and an object image 322 which corresponds to an e-mail address A1.

The section 330, which has been set as one for addresses having a high access frequency, displays an object image 331 which corresponds to a search address 1 and an object image 332 which corresponds to a search address 2.

The section 340 is blank and displays no object images.

The user controls the movement of the avatar 370 with a mouse or the like and goes to the desired address.

The avatar 370 ordinary starts from the home 360 and moves along the road 350.

The camera position is fixed in this example. However, the camera can be arranged based on the view point of the avatar 370 so that the scene can be displayed in real time on a screen.

When the avatar 370 arrives the desired address and in the case where that address is the URL of a WWW page, the WWW browser (not illustrated) displays the WWW page. In the case where the address is an e-mail address, the mailer displays the e-mail editing screen (not illustrated) in the state wherein the e-mail address has been set as the transmission destination.

In the displayed map, the higher the access frequency of an address is, the more closer to the avatar 370 the object image corresponding to the address is displayed. Therefore, when accessing an address whose access frequency is high, the user can immediately arrive the object image corresponding to the address, and thus the map display is convenient.

Furthermore, a sign 380 expressed as "Yellow Page" is presented in the upper left part of the map 300. When the avatar 370 arrives the sign 380, the user jumps to a screen which displays a yellow page managed by the provider.

Figure 15:
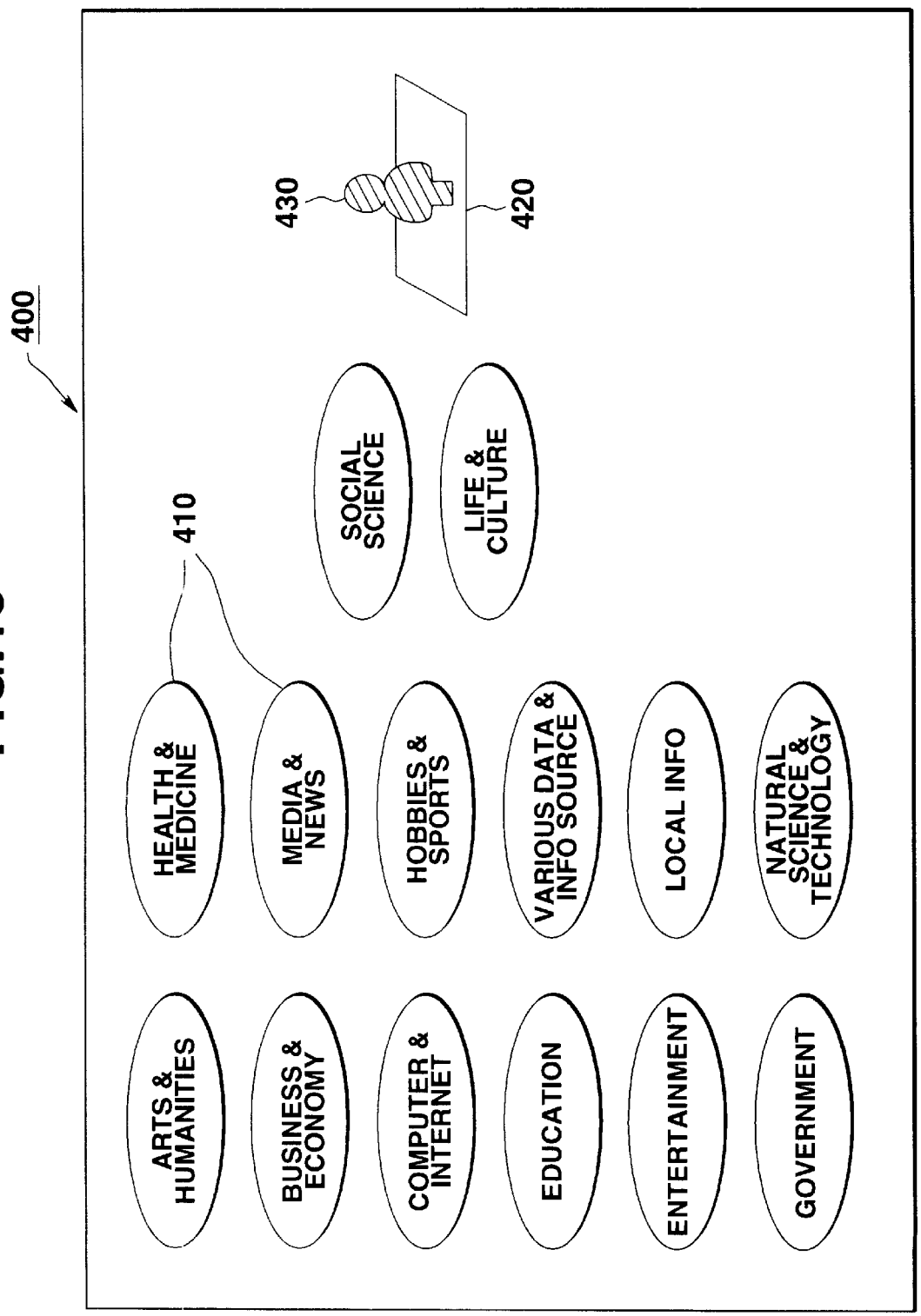
FIG. 15 is a diagram exemplifying a yellow page display screen.

FIG. 15 illustrates the yellow page display screen.

The yellow page display screen 400 illustrated in FIG. 15 has a genre selection area 410 for a selection of genres, a map link 420 which graphically represents and links a map such as that illustrated in FIG. 12 or 13, and an avatar 430 having its home position on the map link 420 and being movable within the display screen 400.

When the avatar 370 arrives the sign 380 expressed as "Yellow Page" due to an user's instruction, the current display screen automatically changes to the yellow page display screen 400 illustrated in FIG. 15.

The environment in which the avatar 370 has existed before then is reduced in size and is replaced with the map link 420, when the avatar 370 becomes the avatar 430.

In accordance with a user's instruction, the new avatar 430 leaves the map link 420 and goes to a genre of interest among the genres shown in the genre selection area 410, in order to find an unexplored page or the like.

When the avatar 430 arrives a genre of interest shown in the genre selection area 410, a search page (not illustrated) associated with the genre is displayed so that the user can find the target page there. The search page provides the user with various methods for arriving the target page. In one method, the user can arrive the target page while narrowing down the searched range by selecting categories one after another depending on the contents to be searched, while in another method, the user can input a keyword which corresponds directly to the target page.

The genre selection area 410 has a plurality of content selection areas provided one for each of the page contents "arts & humanities", "business & economy" and so on, as illustrated in FIG. 15, for example.

The content selection areas 410 may be presented in the form of images which specifically represent their corresponding contents.

Further, the content selection areas 410 may be presented in the form of icons each of which can be selected by clicking thereon directly with a mouse.

When the user, while operating the avatar 430, finds out the target page and accesses that page, the WWW browser displays the target page, simultaneously with which the map data is updated such that the map displayed on the client terminal 151 is updated. When the user cannot find out the target page, the avatar 430 usually returns to the map link 420 in accordance with a user's instruction, when the current display screen changes to the screen displaying the map 300 and the avatar 430 becomes the avatar 370.

Figure 16:
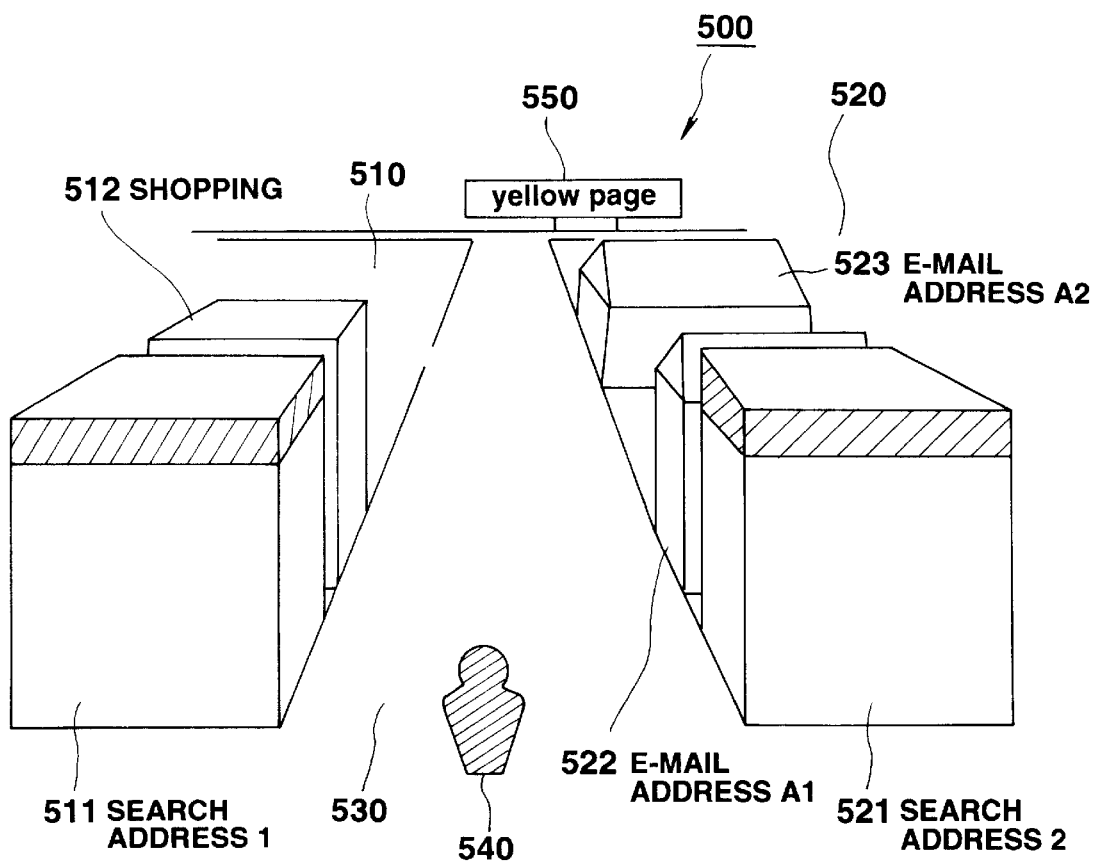
FIG. 16 is a diagram illustrating an example of a map which is displayed in the case of the layout type "change object image display according to access frequency" and language VRML.

FIG. 16 illustrates an example of the map displayed when the layout type is "change the object image display according to access frequency" and the document type is VRML. The map 500 illustrated in FIG. 16 has two main sections 510 and 520, a road 530 between those sections, and an avatar 540.

In this example, the sections 510 and 520 do not have a peculiar significance, and addresses having the highest access frequency are displayed closest to the avatar 540 as the largest object images.

More specifically, in this example, the search addresses 1 and 2 have the highest access frequency, and their corresponding object images 511 and 521 are displayed closest to the avatar 540 as the largest object images.

In addition to the above-described method of representing the degree of the access frequency by changing the sizes of the object images, the method of changing the colors, angles and any other features in appearance of the object images is also available.

The address of a shopping page and the e-mail address A1 are second in the highness of the access frequency to the search addresses 1 and 2, and object images 512 and 522 corresponding to the shopping page's address and the e-mail address A1 are separated from the avatar 540 at greater distances and are displayed in smaller sizes than those of the object images 511 and 521.

The e-mail address A2 has the lowest access frequency, and accordingly its corresponding object image 523 is furthest from the avatar 540 and is displayed in the smallest size.

The object images corresponding to the addresses accord with the types of the addresses. The movement of the avatar 540 and the function of a sign 550 expressed as "Yellow Page" are as described previously.

Figure 17:
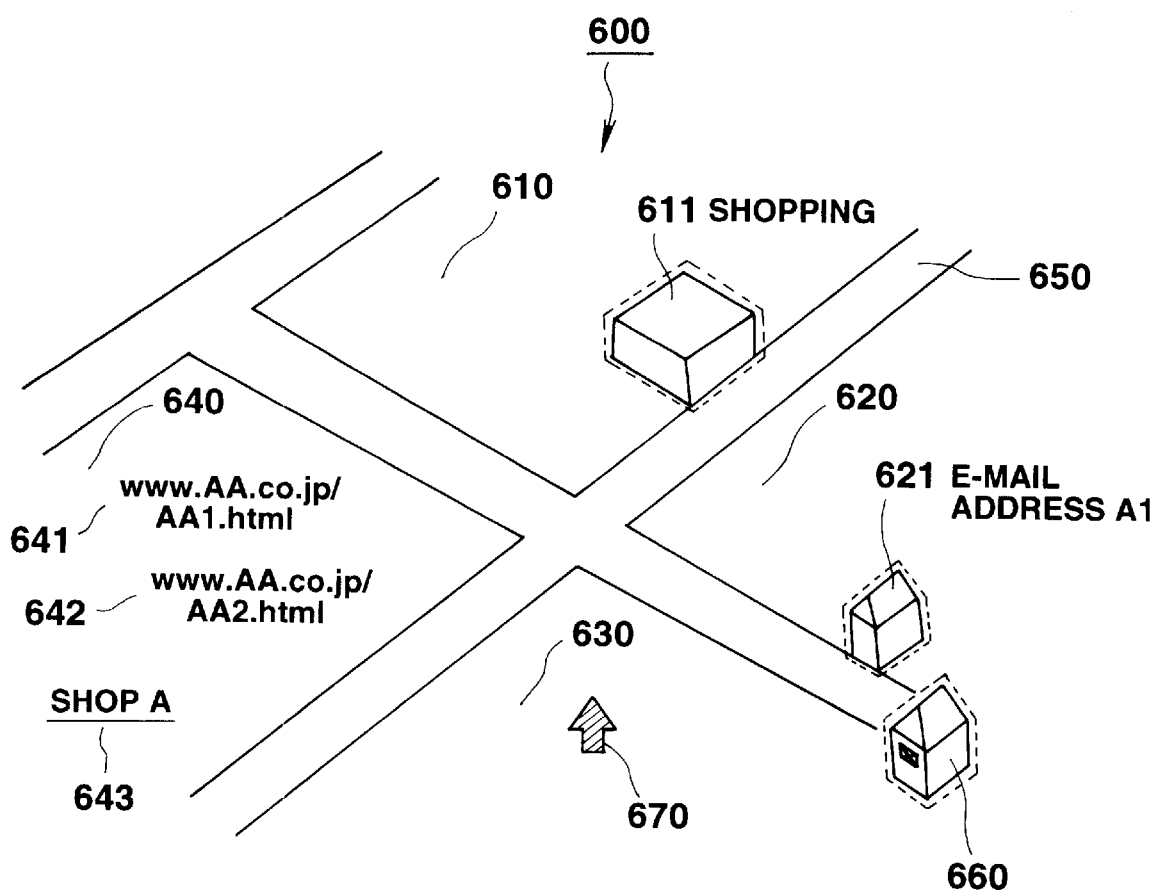
FIG. 17 is a diagram illustrating an example of a map which is displayed in the case of the layout type "classification according to the types of addresses" and language HTML.

FIG. 17 illustrates an example of the map displayed when the layout type is "classification according to the types of addresses" and the document type is HTML. The displayed map 600 illustrated in FIG. 17 has four main sections 610, 620, 630 and 640, and a road 650 between those sections.

The section 610, which has been set as one for addresses associated with shopping, displays an object image 611 connected with a certain shopping page.

The section 620, which has been set as one for e-mail addresses, displays an object image 621 which corresponds to an e-mail address A1.

The section 630 is blank and displays no object images

The section 640, which has been set as one for addresses associated with companies, displays object images 641, 642 and 643 which correspond to three addresses.

A map 600 is based on HTML, and the object images displayed in the sections 610 and 620 utilize clickable map specifications.

Moreover, the three addresses in the section 640 serve as HTML links, and can be displayed not only in the form of actual addresses, but also in the form of texts as in the case of the object image 643, i.e., "shop A."

The map 600 based on HTML is a two-dimensional representation in which avatars like those shown in FIGS. 13 to 15 are not present, and the points from which the object images are viewed are fixed.

In FIGS. 13 to 15, an address is selected by making the avatar arrive the object image corresponding to the address.

In FIG. 17, however, an address is selected by clicking on the image data corresponding to the address with a designation pointer 670 or the like.

Figure 18:
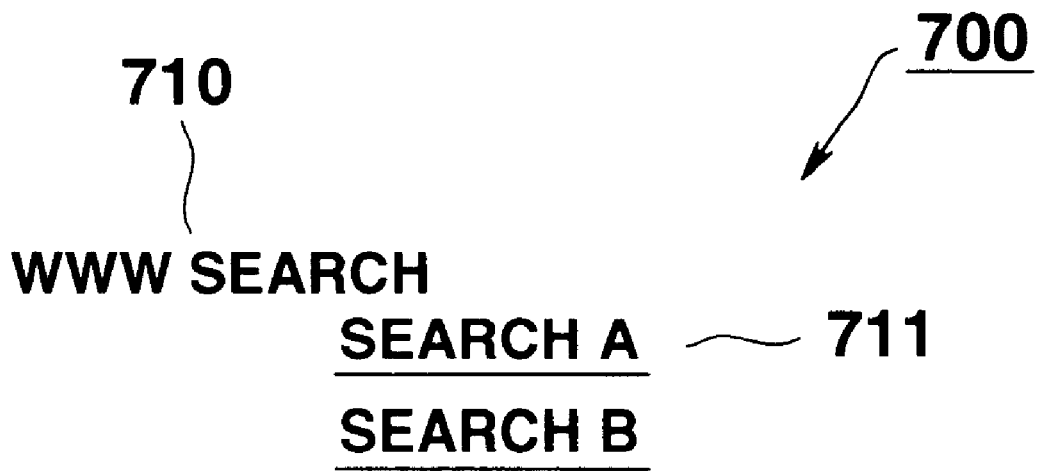
FIG. 18 is a diagram illustrating an example of a text-based map which is a modification of the map illustrated in FIG. 17.

FIG. 18 illustrates a text-based map 700 which is a modification of the map shown in FIG. 17 and in which HTML object images are displayed in the form of texts.

The map 700 shows addresses' types 710 and addresses 711. In FIG. 18, the addresses' types 710 include general groups named "WWW search", "shopping", etc. and more specific subgroups named "clothes", "books", etc.

Such group levels can be set at any number of stages. For example, when a click is performed on "clothes", types such as "casual", "formal", etc. may be displayed following "clothes."

The addresses 711 conform to HTML link specifications such as those explained previously, and can be displayed in the form of addresses themselves or other texts which are easy to understand. Each of the types 710 and the addresses 711 can be selected by performing a mouse click, as in the case of FIG. 17.

When a selected type 710 has a lower-level type 710, that lower-level type 710 is displayed, whereas when the selected type 710 has no lower-level type, the addresses 711 are displayed.

Moreover, as in the case of the map 700 illustrated in FIG. 18, the types 710 and the addresses 711 can be displayed in a mixed state on one screen.

The text-based embodiment illustrated in FIG. 18 is advantageous in the point that the screen display can be performed quickly when the processing capability, resolution, data rate, etc. of the client terminal are not satisfactory.

Figure 19:
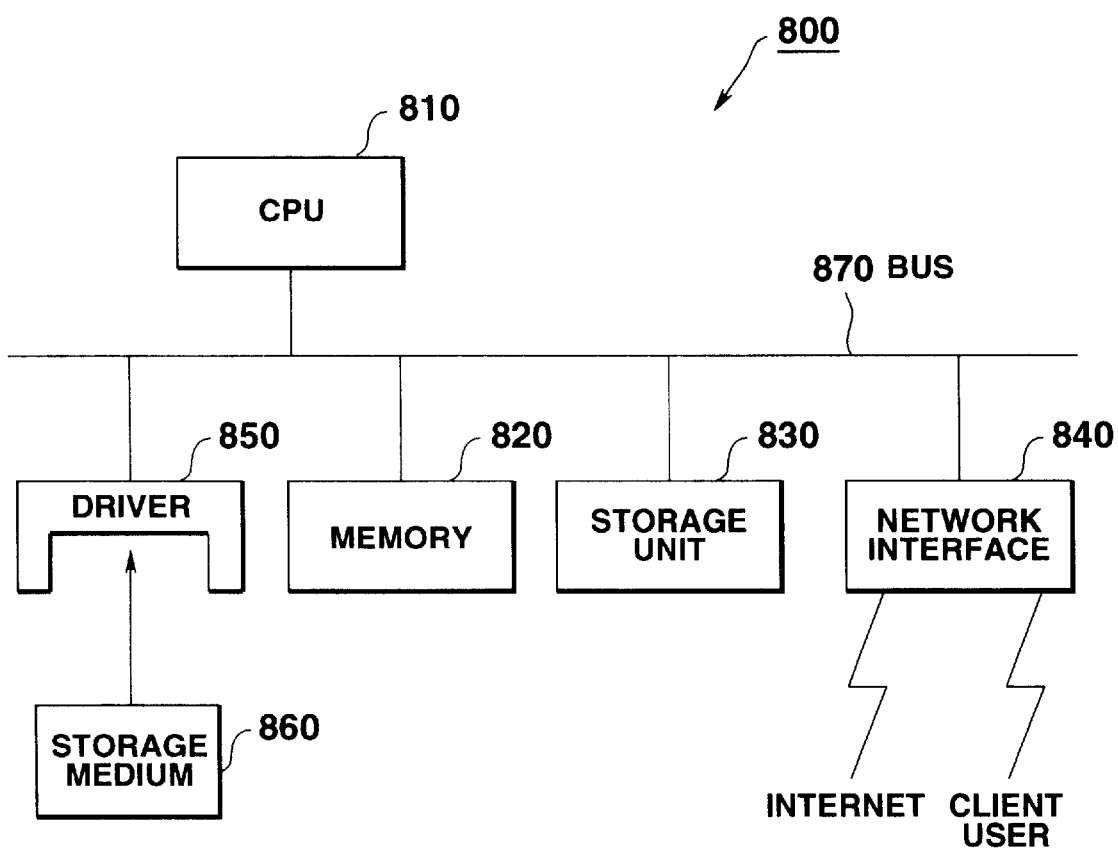
FIG. 19 is a diagram showing the structure of a computer which employs the present invention.

FIG. 19 exemplifies the hardware structure of a computer 800 as which the network-access management system 100 described above has been embodied.

The computer 800 includes a CPU 810, a memory 820, a storage unit 830, a network interface 840, a driver 850 and a storage medium 860, each of which has been connected to a bus 870.

The CPU 810 executes the functions of the units 111, 112 and 113 included in the provider's access management server 110 illustrated in FIG. 2.

Programs for executing the aforementioned functions are loaded into the memory 820. If necessary, the memory 820 temporarily stores data sent from the client terminals 151 and 152, or data read from the client database 120, the provider's e-mail server 130 and the provider's WWW server 140.

The storage unit 830 stores the programs for executing the functions of the aforementioned units included in the provider's access management server 110. The storage unit 830 further stores each table, etc. of the client database 120.

The network interface 840 is a communication interface device which enables the provider's access management server 110 to send/receive data through public lines or the like to/from the client terminals 151 and 152 which are operated by the users. Moreover, the network interface 840 enables the provider's access management server 110 to send/receive data through a LAN or the like to/from the provider's e-mail server 130 and the provider's WWW server 140. The network interface 840 further enables the provider's access management server 110 to send/receive data through the network 160 such as the Internet to/from other e-mail servers 170 and WWW servers 180.

The driver 850 writes data, stored in the storage unit 830, into the storage medium 860 inserted in the driver, or reads out data stored in the storage medium 860, in accordance with an instruction from the CPU 810.

The storage medium 860 is an FDD, an MO, a CD-ROM or the like in which programs for realizing the present invention have been stored.

The bus 870 is a common transfer path for transferring data, instructions, etc. between the structural elements 810 to 860.

Input devices like a mouse and a keyboard, a client terminal such as a CRT display, and a printer like a laser printer can be added to the computer if needed, although they are not illustrated in FIG. 19.

The structure of the client terminal 151 and 152 is basically the same as that illustrated in FIG. 19. However, since the display operation and manipulation of WWW browsers and the VRML viewer are required, the aforementioned input devices and display device are indispensable structural elements.

Second Embodiment

The second embodiment of the present invention will now be described with reference to the accompanying drawings.

Like reference numerals denote like parts throughout the drawings.

The parts represented by like reference numerals are the same as those of the first embodiment, and therefore their explanations will not be made hereinafter.

Figure 20:
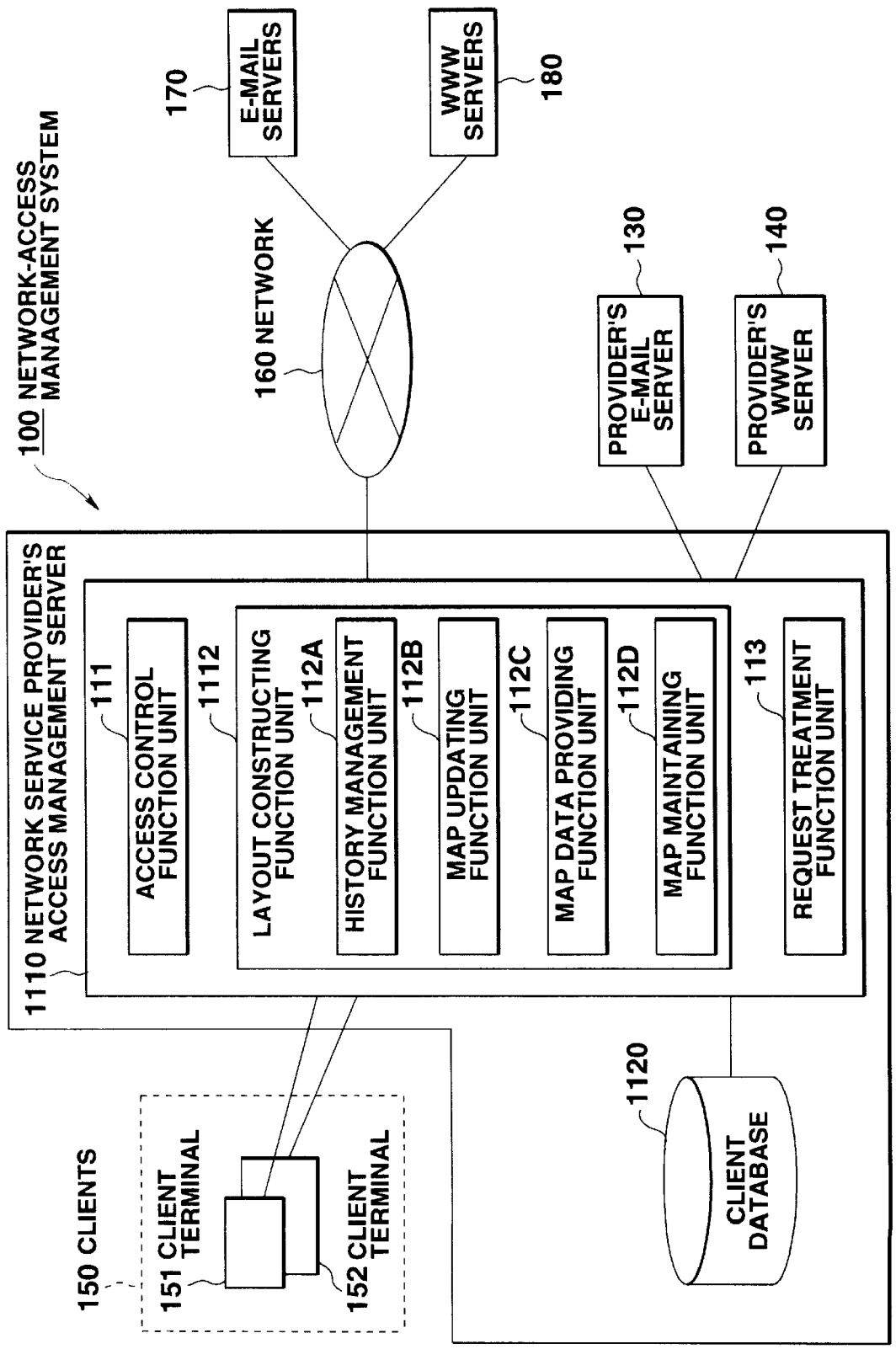
FIG. 20 is a system block diagram illustrating a network-access management system 100 according to the second embodiment of the present invention.

FIG. 20 is a system block diagram illustrating a network-access management system 100 according to the second embodiment of the present invention.

The network-access management system 100 includes a network service provider's access management server 1110, and a client database 1120.

The provider's access management server 1110 has an access control function unit 111, a layout constructing function unit 1112 and a request treatment function unit 113.

The provider's access management server 1110 is connected to a provider's e-mail server 130 and a provider's WWW server 140 when needed.

The layout constructing function unit 1112 includes a history management function unit 112A (history management means), a map updating function unit 112B (layout data updating means) and a map data providing unit 112C (layout data providing means) and a map maintaining function unit 112D (layout data rectifying means). The layout constructing function unit 1112 updates map (layout) data in order that the addresses, which have been accessed in the past by the users, are redisplayed in place of bookmarks and address books as three-dimensional representations which can be selected with ease.

At predetermined intervals which differ depending on the users (or which may be common to the users), the map maintaining function unit 112D automatically accesses the URLs of the WWW pages which have been accessed in the past by the users, irrespective of users' access to the WWW pages and the transmission/reception of e-mails to/from the users. Based on the accessing result, the map maintaining function unit 112D alters, rectifies and updates the map data.

Figure 21:
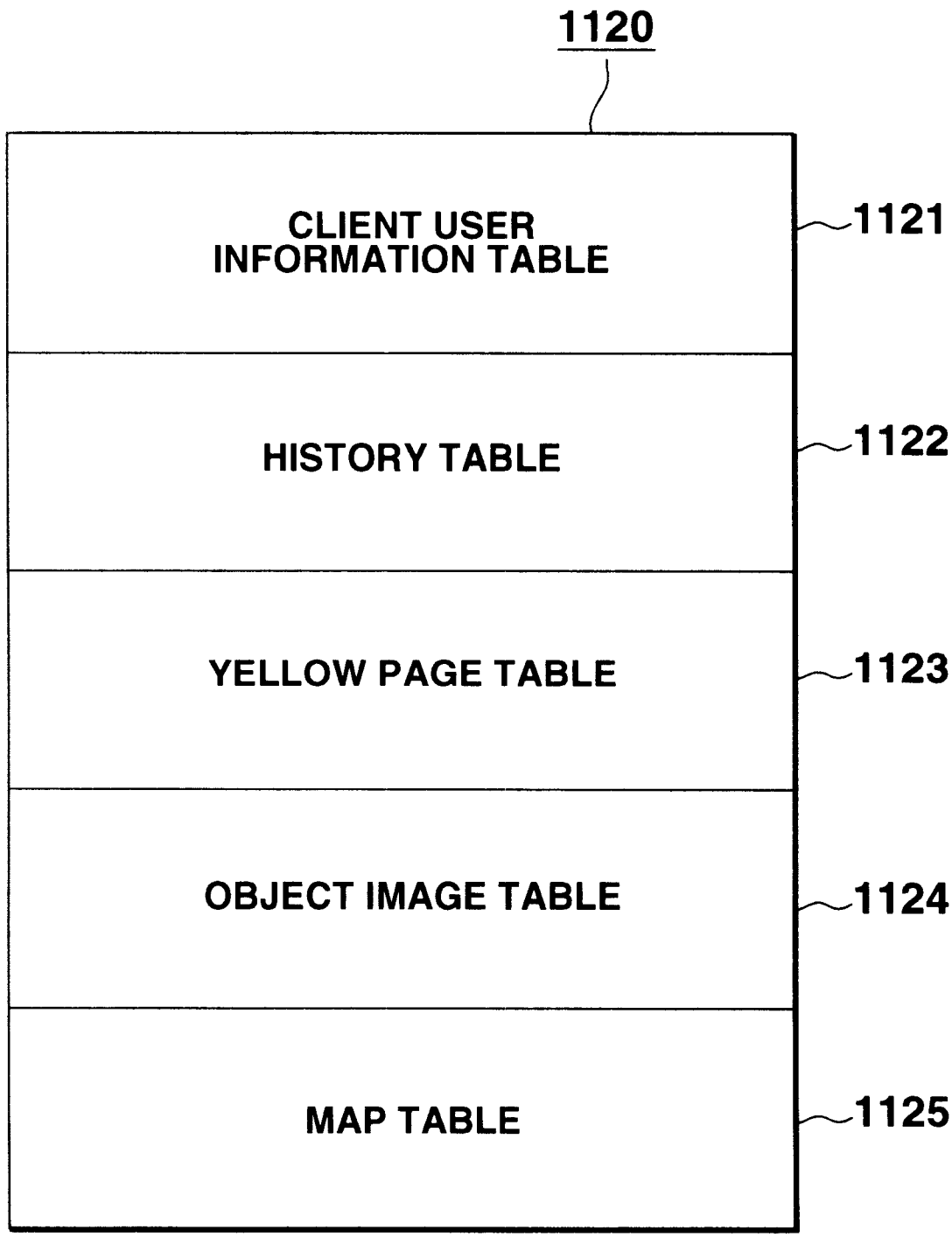
FIG. 21 is a diagram showing the storage contents of tables included in a client database 1120 according to the second embodiment.

As illustrated in FIG. 21, the client database 1120 includes a client user information table 1121, a history table 1122, a yellow page table 123, an object image table 1124 and a map table 1125. (The structure of the yellow page table 123 is the same as that of the first embodiment.)

FIGS. 22 to 25D show the contents of the tables and data stored in the client database 1120.

FIG. 22 exemplifies the file format of the client user information table 1121. In the illustration, the client user information table 1121 has the columns "client user ID information", "client user name", "password", "layout type", "document type", "observation interval" and "previous observation date and time."

The formats of the "client user ID information", "client user name, "password", "layout type" and "document type" are the same as those of the first embodiment.

The observation intervals are the time intervals at which the provider's access management server 1110 sequentially accesses (observes) the URLs which have been accessed in the past by the users. In the example shown in FIG. 22, the observation intervals are expressed in units of days. However, the observation intervals may be expressed in other units such as hours, seconds, etc.

Furthermore, the provider's access management server 1110 is designed that the observation intervals can be managed user by user. However, all users may be equal in the observing intervals to each other, in which case the column "observing interval" is unnecessary.

The column "previous observation date and time" specifies when the provider's access management server 1110 has observed the URLs accessed in the past by the users. The provider's access management server 1110 observes each URL when a predetermined period of time has passed from the corresponding previous observation date and time, and sets the current observation date and time in the column "previous observation date and time".

FIG. 23 exemplifies the file format of the history table 1122. In the illustration, the history table 1122 has the columns "client user ID information", "address", "latest access date and time", "frequency" and "status."

The formats of the "client user ID information", "address", "latest access date and time" and "frequency" are the same as those of the first embodiment.

The column "status" shows the results of the observations which the provider's access management server 1110 has automatically performed with respect to the URLs.

For example, in the case where the page corresponding to an URL has been updated after the date and time of the previous access to the URL, the provider's access management server 1110 sets the status "updated" in the history table 1122. In the case where the provider's access management server 1110 cannot access the page corresponding to an URL because the line is busy, it sets the status "busy" in the history table 1122. In the case where the provider's access management server 1110 cannot find the page corresponding to an URL, it sets the status "not found" in the history table 1122. When the URL of a WWW page has been changed, the provider's access management server 1110 sets the status "moved" in the history table 1122. Thus, depending on condition, the provider's access management server 1110 sets the corresponding status in the history table 1122.

FIG. 24 exemplifies the file format of the object image table 1124 which has the columns "type", "subtype", "status" and "object image data."

The "type" and "subtype" correspond to those of the yellow page table 123 described previously, while the "status" corresponds to that of the history table 1122. A combination of a type, a subtype and a status corresponds to one image data item (a combined key, i.e., a combination of a type, a subtype and a status serves as a unique key).

For example, the first record in FIG. 24 shows that a combination of the type "shopping", the subtype "car" and the status "normal" corresponds to the image data item "c:¥image¥shopping¥car1.gif."

The image data referred to in FIG. 24 is GIF data. However, the image data may include any other data which can represent images such as animation GIF, BMP files, etc.

In the case of VRML, coordinates data, etc. which define the stereoscopic or three-dimensional representation of a display image are also stored, although such data are not exemplified in this embodiment.

FIGS. 25A to 25D illustrate examples of image data stored data in the object image table 1124 and displayed as images on an appropriate editing screen.

In other words, FIGS. 25A to 25D exemplify GIF files in HTML documents when those files are displayed as images on the editing screen. It is preferred that each image be set as such an image as can represent the type, subtype and status of an address.

Figure 25A:
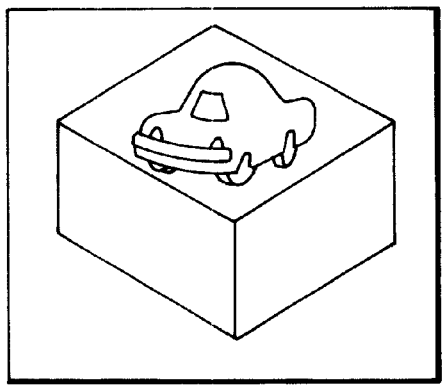
FIGS. 25A–25D are diagrams illustrating examples of image data stored in the object image table 1124 of the second embodiment.
Figure 25B:
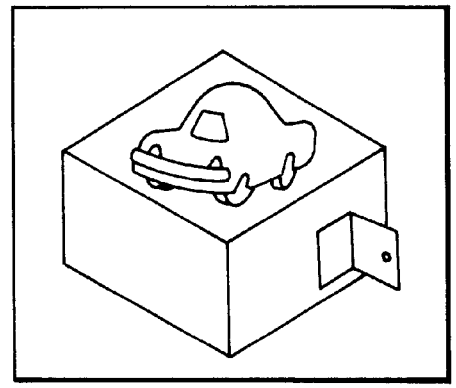
Figure 25C:
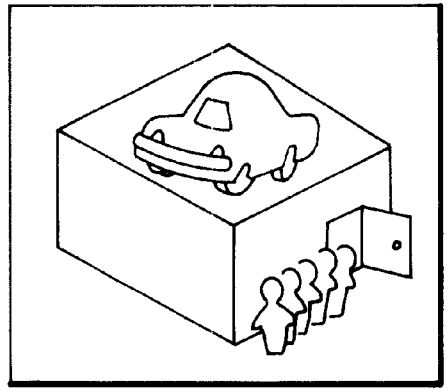
Figure 25D:
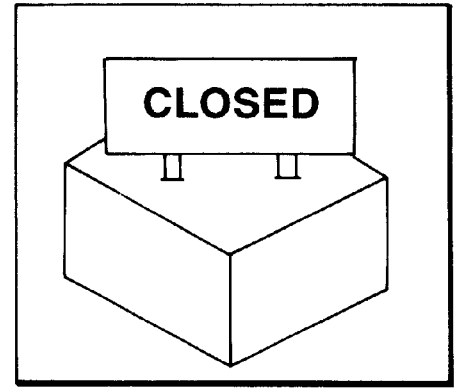

Specifically, an image or car1.gif, illustrated in FIG. 25A, represents a car shopping page whose status or accessing result shows that a normal access thereto is available. An image or car2.gif, illustrated in FIG. 25B, represents a car shopping page whose status or accessing result shows that the page has been updated recently. An image or car3.gif, illustrated in FIG. 25C, represents a car shopping page whose status or accessing result shows that it will take a long time to establish an access because the line is busy. An image or car4.gif, illustrated in FIG. 25D, represents a car shopping page whose status or accessing result shows that there is a high possibility of the page being not found due to a change in its URL or the like.

The procedures which are carried out by the provider's access management server 1110 will now be described in detail, with reference to the flowcharts illustrated in FIGS. 26 to 28.

Figure 26:
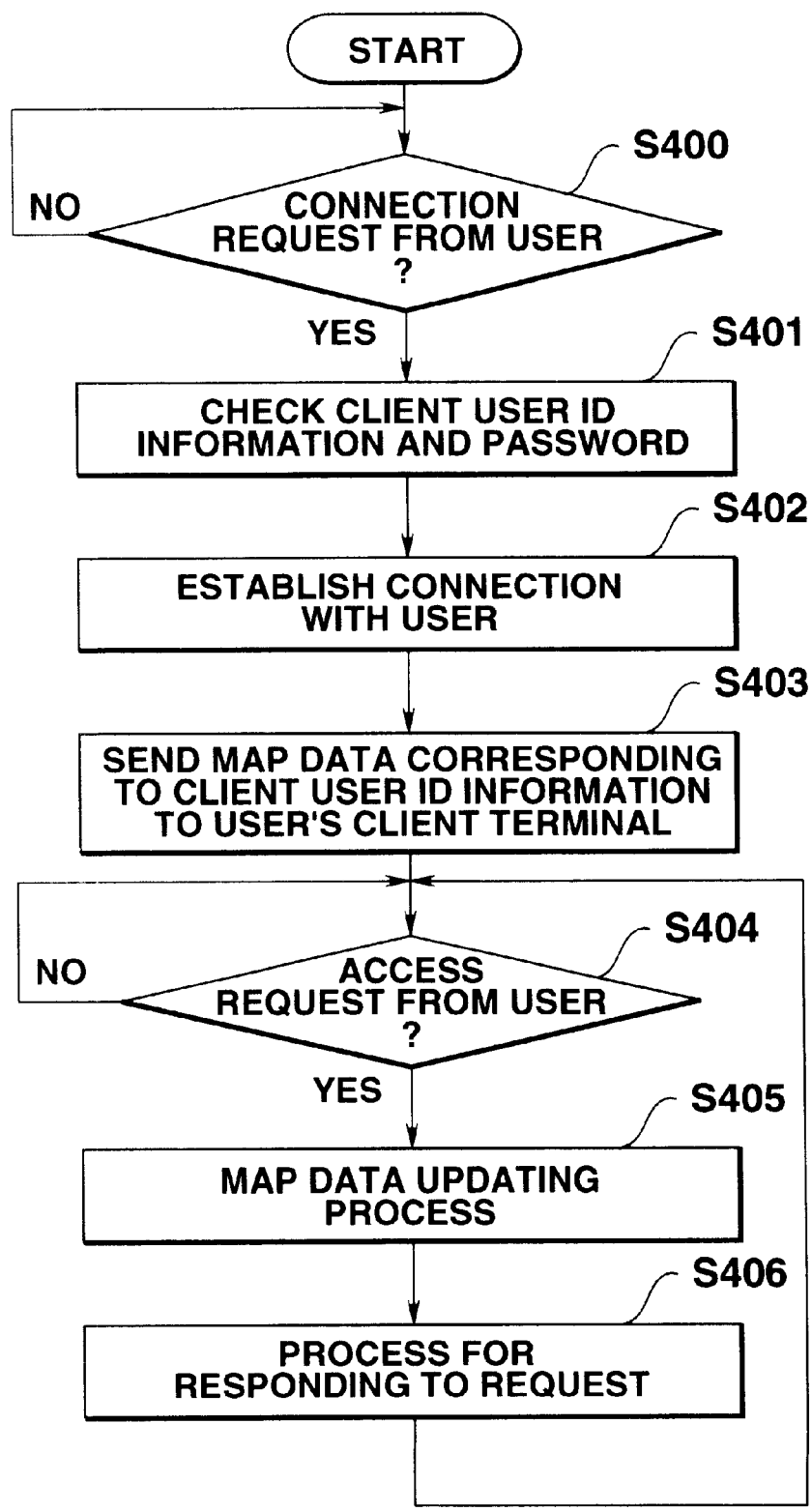
FIG. 26 is a flowchart showing the entire procedures which are executed by a network service provider's access management server 1110 according to the second embodiment.

FIG. 26 shows the flow of the procedures which are executed by the provider's access management server 1110 when a user connects the client terminal 151 to the provider's access management server 1110 by operating the client terminal 151 and thereafter accesses a resource on the network 160.

Firstly in a step S400, the provider's access management server 1110 waits for a connection request from the user.

When the provider's access management server 1110 determines that the connection request has been received ("Yes" in the step S400), it checks the client user ID information and the password of the user in a step S401.

When the provider's access management server 110 determines that no connection request has been received ("No" in the step S400), it repeats the determination in the step S400.

In the step S401, the provider's access management server 1110 compares the password input by the user with the password which corresponds to the client user ID information in the client user information table 1121. When there is no coincidence between both passwords, the provider's access management server 1110 refuses the connection of the client terminal 151.

When the client user ID information and the password are proper, the provider's access management server 1100 goes to a step S402, in which the provider's access management server 1110 authenticates that the user or the connection requester is an authorized client user, and establishes a session between the provider's access management server 1110 and the client terminal 151 of the user.

Next the provider's access management server 1110 goes to a step S403, in which the provider's access management server 1110 sends the map data corresponding to the client user ID information of the session-established user and data necessary for displaying the map data, from the map table 1125 to the client terminal 151 of the user.

At that time, in the case where there is any e-mail which has not been read by the user in the provider's e-mail server 130, the provider's access management server 1110 affixes information concerning the e-mail to the map data in order to inform the user of the presence of the e-mail which has not been read by the user, and then sends the map data to the user.

In a step S404, the provider's access management server 1110 determines whether the user has issued a request for an access to a resource on the network 160.

When the provider's access management server 1110 determines that the user has not issued such an access request ("No" in the step S404), it repeats this determination. The provider's access management server 1110 may cut the connection with the client terminal 151 in the case where such an access request is not received while the provider's access management server 1110 is repeating the determination within a predetermined period of time.

When such an access request is received from the user ("Yes" in the step S404), the provider's access management server 1110 goes to a step S405.

In the step S405, the provider's access management server 1110 updates the map data which the map table 1125 stores in association with the user, in accordance with the content of the user's access.

In a step S406, the provider's access management server 1110 carries out a process for dealing with a user's request.

This process is the same as that carried out by a conventional provider, and includes all procedures carried out with respect to the resource on the network 160, such as accessing to a WWW page, sending/receiving the e-mail, downloading data from an WWW site, etc.

When the provider's access management server 1110 finishes the step S406, it returns to the step S404 and waits for an access request from any user again.

Figure 27:
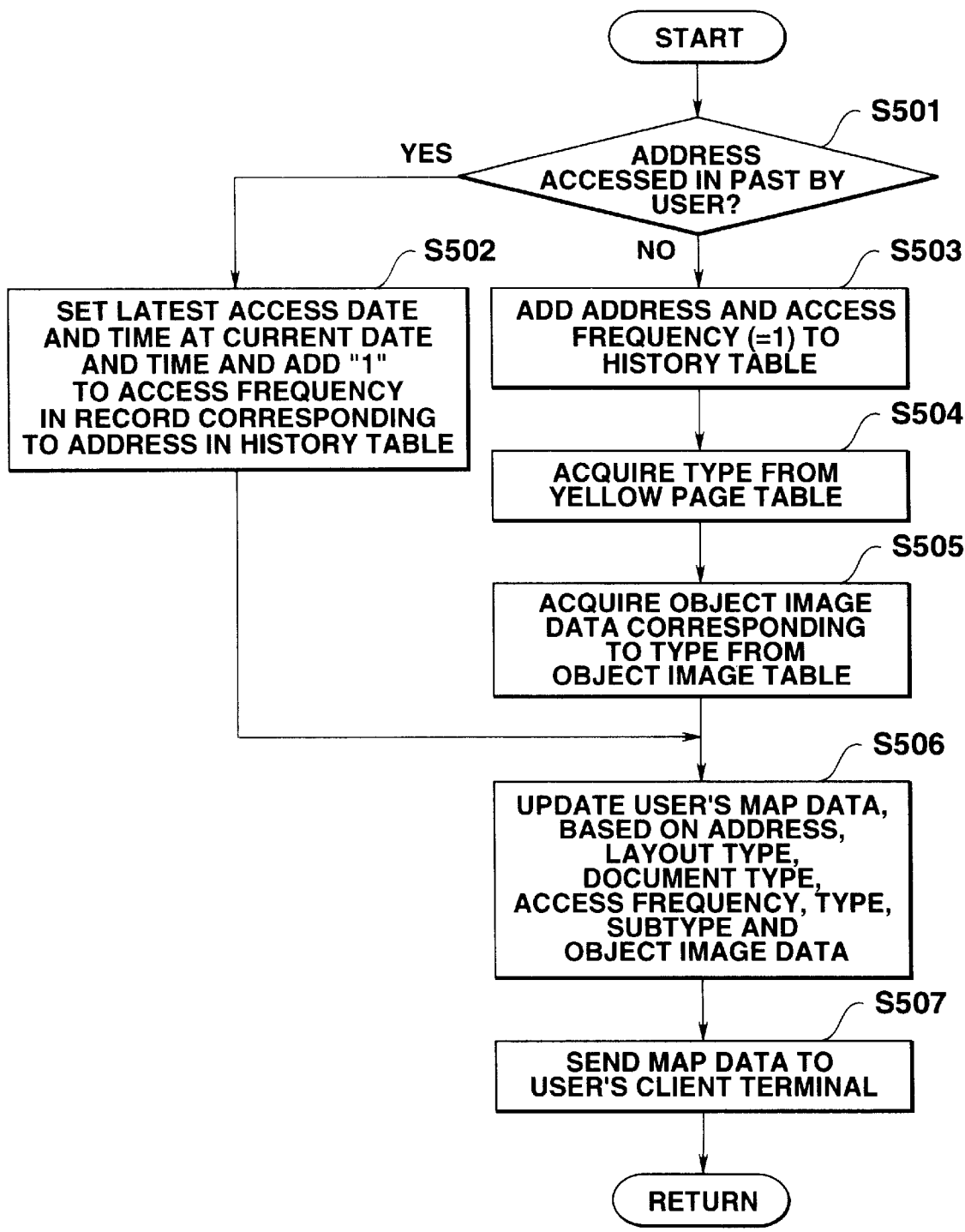
FIG. 27 is a flowchart showing a map data updating process which is carried out by the provider's access management server 1100.

FIG. 27 explains in detail the map data updating process executed in the step S405 shown in FIG. 26.

Firstly in a step S501, the provider's access management server 1110 determines whether the address to which the user has requested a connection is one accessed in the past by the user.

This determination is performed by searching addresses (URLs, e-mail addresses) which the history table 1122 stores in association with the client user ID information of the user.

When the provider's access management server 1110 determines that the address is one accessed in the past by the user ("Yes" in the step S501), it goes to a step S502, in which the provider's access management server 1110 updates the record corresponding to the address in the history table 1122, by setting the latest access date and time at the current date and time and by adding "1" to the frequency.

In the case where the provider's access management server 1110 is designed so as to add a new record to the history table 1122 each time an access is made, the provider's access management server 1110 sets the address, the latest access date and time and the access frequency (=1) to the new record and adds the new record to the history table 1122.

Thereafter, the provider's access management server 1110 goes to a step S506.

When the provider's access management server 1110 determines in the step S501 that the address is not one accessed in the past by the user ("No" in the step S501), it goes to the step S503, in which the provider's access management server 1110 adds a new record which contains the address, the access date and time and the frequency (=1) to the history table 1122.

Then the provider's access management server 1110 goes to the step S504, in which the provider's access management server 1110 acquires the type and subtype corresponding to the address from the yellow page table 123.

Thereafter, based on the type and subtype acquired in the step S504, the provider's access management server 1110 acquires the corresponding image data from the object image table 1124 in a step S505.

In the step S506, the provider's access management server 1110 alters, rectifies and updates the user's map data, based on the accessed address, the corresponding layout type and document type in the client user information table 1121, the frequency in the history table 1122, the type and subtype in the yellow page table 123, and the image data acquired from the object image table 1124 in the step S505.

The required data differs depending on the layout type in the client user information table 1121, and all of the above-described data are not necessarily needed.

The image data acquired in the step S505 represents such an image as that in the normal case shown in FIG. 25A explained previously.

Nevertheless, the result of the actual access to the requested access may be stored as a status in the history table, and the corresponding image data (e.g. FIGS. 25A to 25D) may be acquired in accordance with the status, as in the case of the map maintaining function unit 112D which will be explained later in detail.

In this case, however, the process is carried out with respect to the requested URL only, unlike in the case of the map maintaining function unit 112D which will be explained later.

Having completed the update, the provider's access management server 1110 stores the updated map data in the map table 1125 and supplies (sends) the map data and the associated data to the client terminal 151 in a step S507.

By so doing, the client terminal 151 of the user, when he/she accesses a new address or when a change occurs in the access frequency, is supplied in real time with the map data which reflects those conditions, and the client terminal 151 performs the map display based on the supplied map data.

The map data updating process executed in the step S506 is the same as that of the first embodiment, and therefore will not be explained herein.

Figure 28:
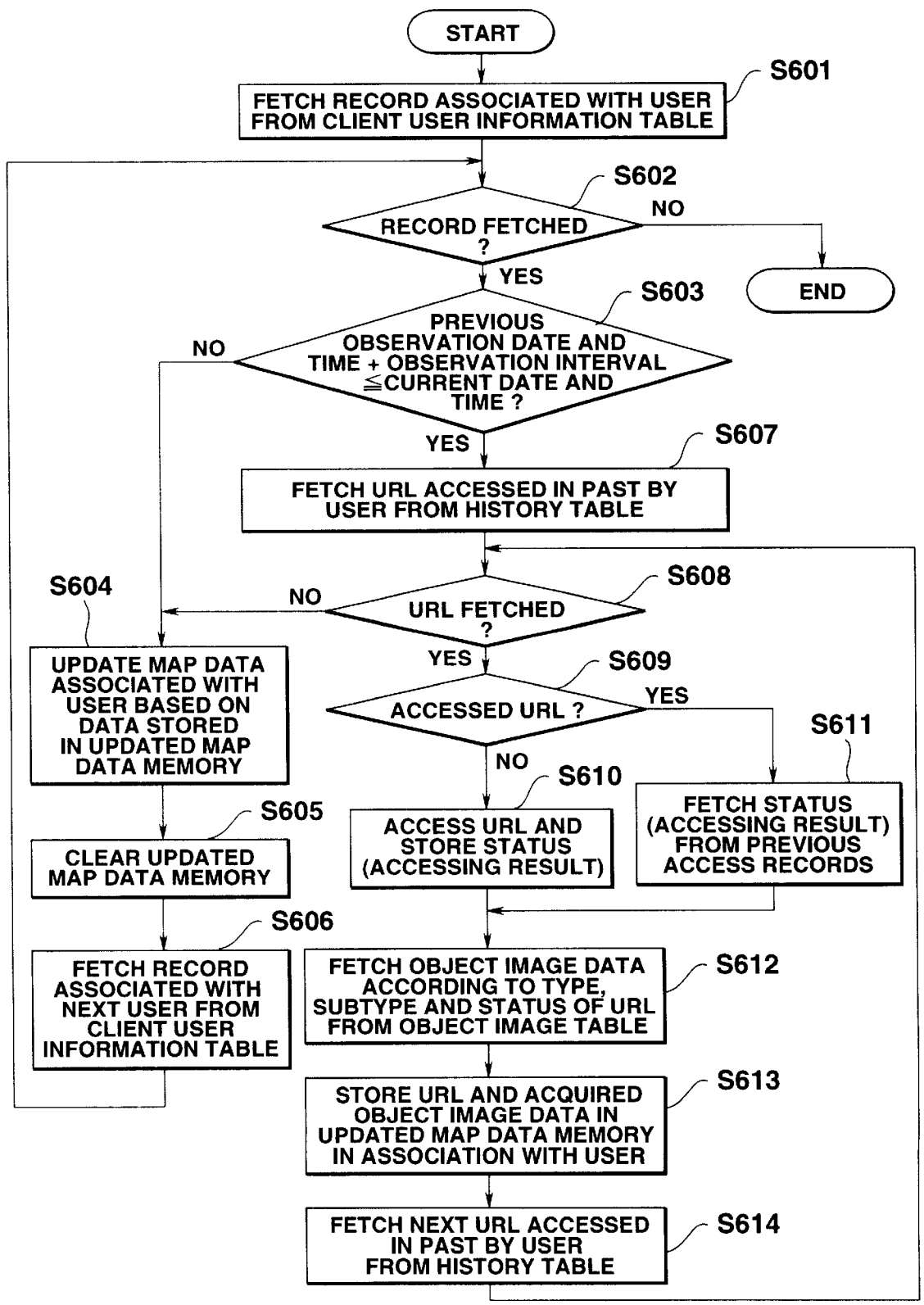
FIG. 28 is a flowchart showing a map data maintaining process which is carried out by the provider's access management server 1100.

FIG. 28 shows the flow of a map maintaining process.

This process is executed at the predetermined timing explained before, irrespective of an user's access to the resource on the network 160.

At the timing set for each user, the map maintaining function unit independently accesses (observes) the addresses (which are basically the URLs of WWW pages and exclude e-mail addresses) accessed in the past by the user, and automatically updates the user's map data in accordance with the result of the observation.

The time intervals at which the map maintaining function unit determines whether the timing set for the user has passed are also arbitrary.

By so doing, when the user performs the map display next time, the images corresponding to the addresses accessed in the past by him/her are displayed in the state of reflecting the conditions of the recent user's accesses to the addresses.

In the first step S601 of the process shown in FIG. 28, any records associated with a given user are sequentially fetched from the client user information table 1121.

In the next step S602, it is determined whether a record associated with the user has been actually fetched or not. The flow of the process ends when it is determined that no record has been fetched ("No" in the step S602).

When it is determined that a record associated with the user has been fetched ("Yes" in the step S602), the flow of the process advances to a step S603. In the step S603, it is determined whether the date and time after the lapse of the "observation interval" from the "previous observation date and time" in the record are the same as the current date and time or earlier than the current date and time.

When it is determined that the date and time after the lapse of the observation interval from the previous observation date and time are earlier than the current date and time ("Yes" in the step S603), in short, in the case of "previous observation date and time+observation time interval≦current date and time", the flow of the process advances to a step S607. In the step S607, one of the URLs which the user associated with the record has accessed in the past is fetched from the history table 1122.

In the next step S608, it is determined whether one URL has been actually fetched or not.

When it is determined that one URL has been fetched ("Yes" in the step S608), the flow of the process advances to a step S609, in which it is determined whether the URL has already been accessed during a series of procedures.

When it is determined that the URL has not yet been accessed ("No" in the step S609), the URL is accessed and the status of the access to the URL (the accessing result) are stored in a step S610.

When it is determined that the URL has already been accessed ("Yes" in the step S609), the status is fetched from previous access records in a step S611.

In the case where the user have accessed the same address in the past, the above-described steps can prevent observing the same address again and again in one process.

After the completion of the steps S610 and S611, the flow of the process advances to a step S612, in which an object image according to the type, subtype and status of the URL is fetched from the object image table 1124.

The object image (the GIF file, animation GIF or the like) corresponding to the URL is replaced with the object image thus fetched according to the accessing result. However, the replacement of the object image may not be effected, and a method wherein an image of a flag (e.g. an advertising balloon, a signboard, a banner or the like) indicating the accessing result is laid out on or near the existing object image, may be adopted instead.

This method requires a new table which stores flags indicating different accessing results. However, the object image table does not need to store object images according to statuses (accessing results) together with combinations of types and subtypes. This allows the capacity of the object image table to be reduced.

The statuses (accessing results) are not limited to the statuses of connections, and may include statuses such as the update of the contents of home pages and changes in their topics including information such as that a bargain, a sale, a present, etc. are available on the home pages.

Moreover, according to whether an e-mail opening acknowledgement has been received or not, the image 10 corresponding to the e-mail address can be changed to another, the color of the image can be varied, or the image of a flag can be affixed to the existing image as explained above.

The updating date of a home page can be grasped by, for example:

1-1. acquiring the updating date from link information on the home page;

1-2. acquiring the file updating date from the structured document data corresponding to the index page of the home page;

1-3. acquiring date information based on a pattern such as a format from the display contents contained in the structured document data; and 1-4. acquiring date information described in a predetermined rule from the non-displayed tag contained in the structured document data (if a standardization is realized in future).

Whether a bargain, a sale, a present, etc. are available on home pages can be determined by, for example:

2-1. specifying, by means of a search engine, the home pages which use character strings like "bargain", etc. under a specific condition:

2-2. finding such home pages through manual operations on the part of the provider and marking the home pages (in this case, it is preferred that the information concerning the home pages be stored in the yellow page table).

Next, in a step S613, a set which is formed of the URL and the image data as fetched for the URL is stored in an updated map data memory in association with the user corresponding to the aforementioned record. Then, the next URL accessed by the user in the past is fetched in a step S614, and the flow of the process returns to the step S608.

When the result of the determination in the step S603 is "No" or when the result of the determination in the step S608 is "No", the flow of the process goes to a step S604.

In the step S604, when the updated map data memory has data stored therein, the map data associated with the user is updated based on the stored data.

The map data is updated in the same manner as that explained previously.

At this point, however, a variety of images is selected as the fetched image data.

In a step S605, the updated map data memory is cleared to make preparations for executing the above-described steps in connection with the next user.

In a step S606, a record associated with the next user is fetched from the client user information table 1121, and the flow of the process returns to the step S602.

When the result of the determination in the step S603 is "No", only the step S606 is executed substantially and the flow of the process returns to the step S602.

The flowchart shown in FIG. 28 and the flow of the process explained above are only examples presented to facilitate an understanding of the second embodiment of the present invention, and the second embodiment is not necessarily limited to them.

Moreover, by the aforementioned process, the statuses or the conditions of the accesses to the individual URLs can also be managed, and a display method in which the images corresponding to the URLs are classified according to status, in addition to the above-described image classification according to access frequency, can be realized.

Furthermore, in the aforementioned process, various modifications such as the following are possible:

3-1. gaining an access at predetermined equal time intervals common to all users, without setting the observation time per user;

3-2. acquiring the accessing results only for the addresses having a high access frequency;

3-3. setting a status determination standard (for example, if a certain URL is accessed five times successively and the line is busy every time, the status of the URL is determined as "busy"), taking into consideration the possibility of the statuses "busy" and "not found" being temporary.

Figure 29:
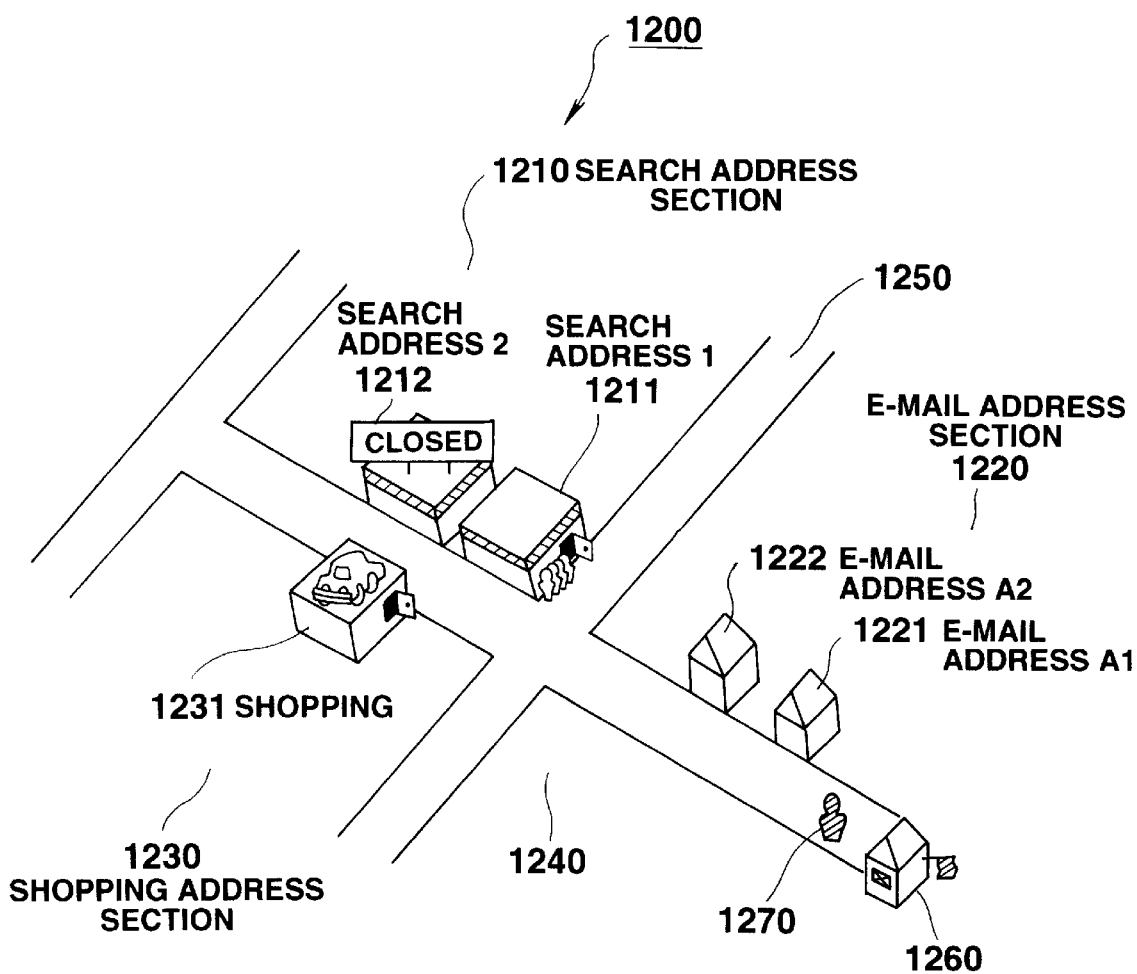
FIG. 29 is a diagram illustrating an example of a map which is displayed in the case of the layout type "classification according to the types of addresses" and language VRML.

FIG. 29 illustrates an example of the map displayed on the client terminal 151.

FIG. 29 exemplifies the case where the layout type is "classification according to the types of addresses" and the document type is VRML.

In other words, FIG. 29 exemplifies the map displayed in the case where a user has accessed a number of addresses in the past and the map maintaining function unit 112D has executed the process shown in FIG. 28 at least one time.

The displayed map 1200 illustrated in FIG. 29 has four main sections 1210, 1220, 1230 and 1240, a road 1250 between those sections, a home 1260 and avatar 1270.

The section 1210, which has been set as one for addresses associated with a home page search, displays an object image 1211 which corresponds to a search address 1 and an object image 1212 which corresponds to a search address 2.

Those object images are stereoscopic or three-dimensional representations in the case of VRML, and their appearances change with reality, depending on the view point of the avatar 1270.

The section 1220, which has been set as one for e-mail addresses, displays an object image 1221 which corresponds to an e-mail address A1 and an object image 1222 which corresponds to an e-mail address A2.

The object image 1211 corresponding to the search address 1 is represented using an "busy" image in which a large number of people are standing in front of a building. The object image 1211 shows that the map maintaining function unit 112D could not gain an access because the line was busy.

The object image 1212 corresponding to the search address 2 is represented using an image in which a signboard "closed" is situated on a building, and shows that the map maintaining function unit 112D attempted to gain an access (once or a plurality of times) but could not find the corresponding page.

The section 1230, which has been set as one for addresses associated with shopping, displays an object image 1231 representing a certain shopping page.

The section 1240 is blank and displays no object images.

The object image 1231 corresponds to a page associated with the shopping of a car, and is represented as an image similar to that illustrated in FIG. 25B. This shows that that the map maintaining function 112D has determined that the page was updated after the previous access time.

In the object image table 1124, as described previously, different object images are assigned one to each of combinations of the types (general groups) and subtypes (more specific subgroups) of the addresses. For convenience of explanation, however, let it be assumed herein that different object images are assigned one to each of combinations of the types (general groups) and statuses of the addresses and are displayed as illustrated in FIG. 29.

However, the object image representing the home 1260 is fixed.

Third Embodiment

The third embodiment of the present invention will now be described with reference to the accompanying drawings.

Like reference numerals or symbols denote like parts throughout the drawings, as in the case of the second embodiment.

The parts represented by like reference numerals are the same as those of the first and second embodiments, and therefore their explanations will not be made hereinafter.

Figure 30:
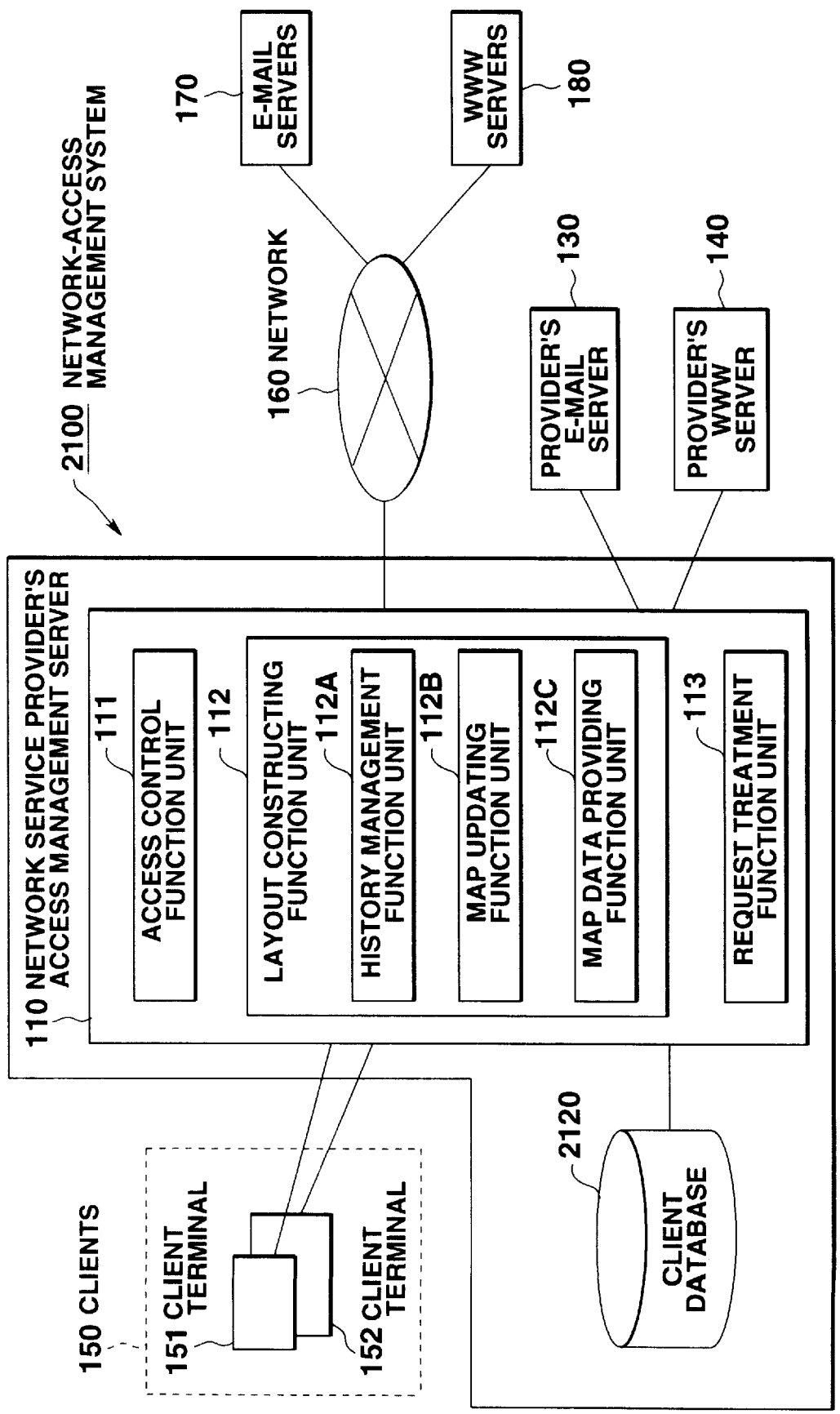
FIG. 30 is a system block diagram illustrating a network-access management system 100 according to the third embodiment of the present invention.

FIG. 30 is a system block diagram illustrating a network-access management system 2100 according to the second embodiment of the present invention.

The network-access management system 2100 includes a network service provider's access management server 110, and a client database 2120.

The provider's access management server 110 has an access control function unit 111, a layout constructing function unit 112 and a request treatment function unit 113.

The provider's access management server 110 is connected to a provider's e-mail server 130 and a provider's WWW server 140 when needed.

Figure 31:
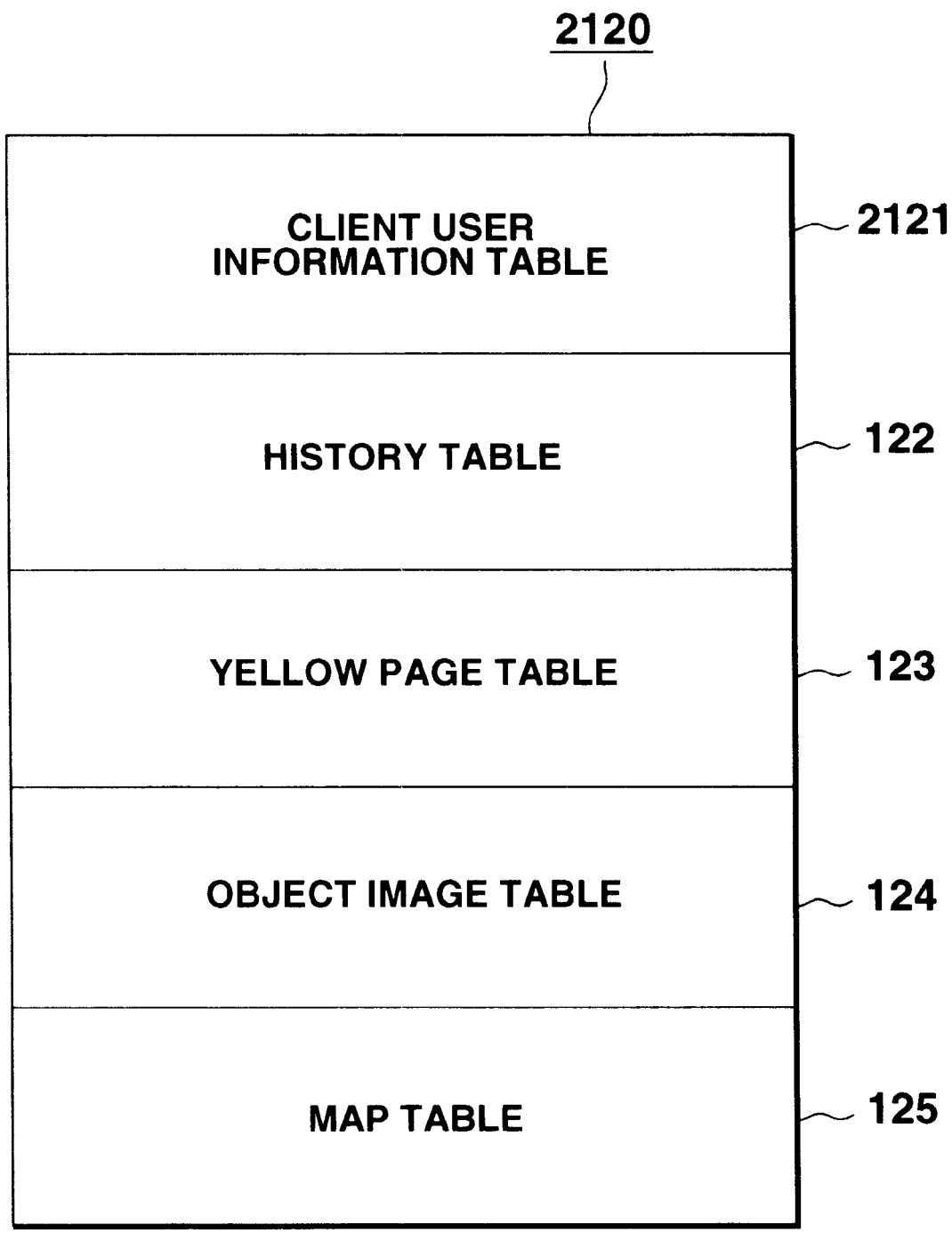
FIG. 31 is a diagram showing the storage contents of tables included in a client database 2120 according to the third embodiment.

As illustrated in FIG. 31, the client database 2120 includes a client user information table 2121, a history table 122, a yellow page table 123, an object image table 124 and a map table 125.

FIG. 32 exemplifies the file format of the client user information table 2121 in the client database 2120 used in the third embodiment of the present invention. In the illustration, the client user information table 1121 has the columns "client user ID information", "client user name", "password", "layout type" and "terminal spec."

The formats of the "client user ID information", "client user name, "password" and "layout type" are the same as those of the first and second embodiments.

The column "terminal spec" includes the columns "CPU", "memory", "line", "display color" and "display size."

The column "CPU" specifies the performances of the CPUs employed in the client terminals 151 and 152 which are utilized by users. In this example, their microprocessors and the clock speeds thereof are the criteria of the performances.

In FIG. 32, "P-133" represents a Pentium microprocessor whose operation frequency is 133 MHz, while "P-150" represents a Pentium microprocessor whose operation frequency is 150 MHz.

The column "memory" specifies the capacities of the memories of the client terminals 151 and 152.

The column "line" specifies the data rates of the communication lines used to connect the client terminals to the provider's access management server 110. The data rates are determined by the kinds of the communication lines and communication units such as modems.

In this example, the data rates are 33.6 Kbps (kilobits per second) and 64 Kbps. The column "display color" specifies how many different colors can be displayed on the display devices connected to the client terminals 151 and 152. The number of colors differs depending on the display devices, graphics boards, the setting of the users, etc.

In FIG. 32, 16 bits (65, 535 colors) and 256 colors are exemplified.

The column "display size" specifies how many dots (pixels) can be displayed on the display devices connected to the client terminals of the users. The number of dots also differs depending on the display devices, graphics boards, the setting of the users, etc.

In FIG. 32, a display size of 800×600 (800 dots on each of 600 lines) and a display size of 1024×768 (1024 dots on each of 748 lines) are exemplified. The larger number of display dots, the higher resolution.

It is preferred that the above-described items contained in the column "terminal spec" be registered by the individual users. However, they may be registered by the provider or any other person/party.

Furthermore, the above-described items are merely examples, and any other items representing performance indexes for all kinds of devices which the users can utilize to display map information can be set in the column "terminal spec."

In the third embodiment, each user can access the provider's access management server 110 via his/her own predetermined client terminal only. According to a basic structure, however, each user can access the provider's access management server 110 also via any electronic apparatus insofar as the electronic apparatus is communication equipment having a WWW browser and a mailer installed therein, and each user may have a plurality of such electronic apparatuses, for example.

In this case, in the client user information table 2121, a plurality of layout types and terminal specs can be registered in association with one piece of client user ID information.

It is preferred that when sending connection requests to the provider's access management server 110 in the above-described case, the users send the IDs (the names of the manufacturers and the manufacturing numbers) of their respective client terminals to the provider's access management server 110 so that the provider's access management server 110 can discriminate the terminal specs in accordance with the IDs of the client terminals.

The procedures which are carried out by the provider's access management server 110 will now be described in detail, with reference to the flowcharts illustrated in FIGS. 33 and 34.

Figure 33:
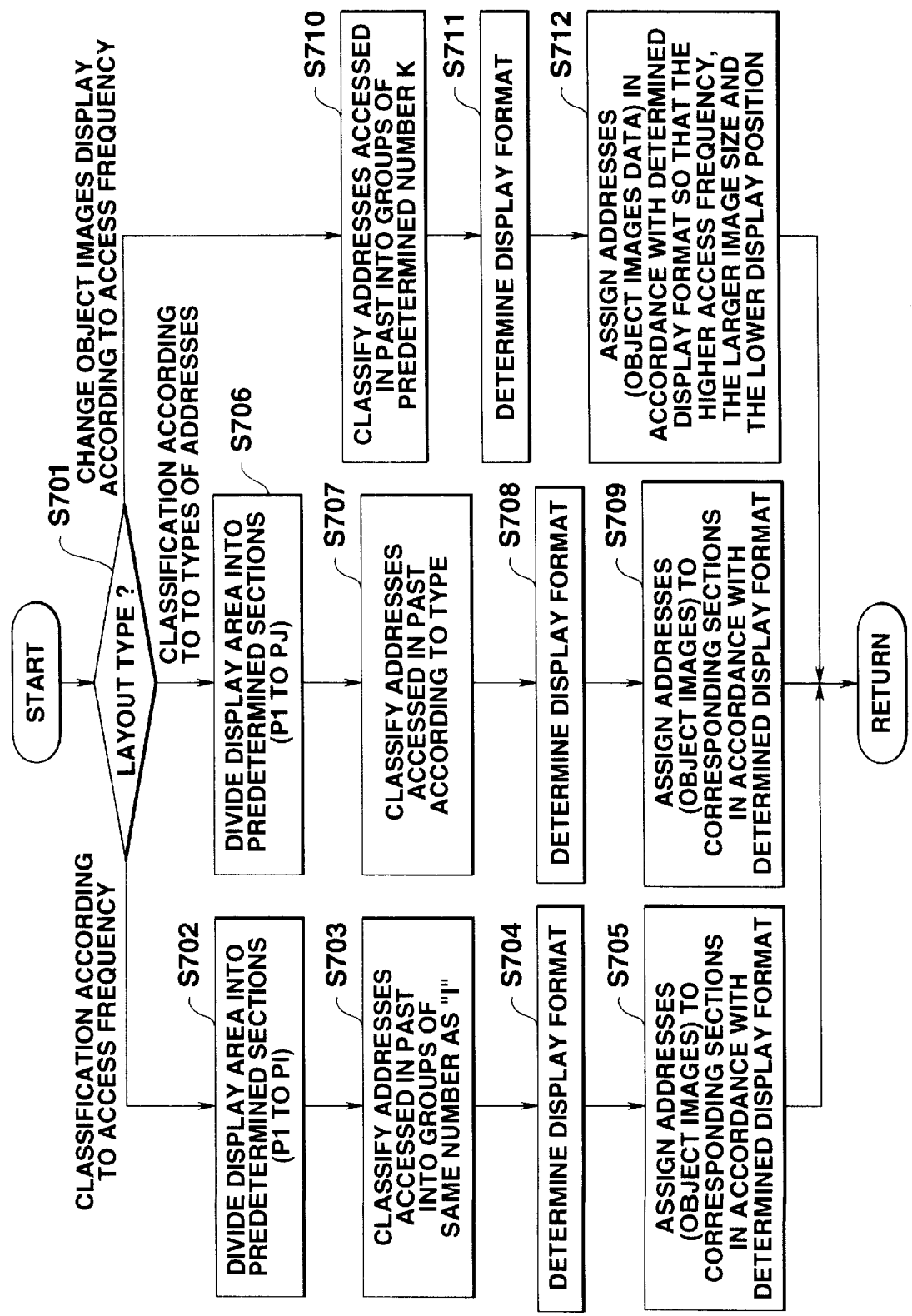
FIG. 33 is a flowchart showing the process for updating the map data according to layout type in more detail.

FIG. 33 explains the step S206 of the same process as that (shown in FIG. 11) of the first embodiment in more detail, in accordance with the third embodiment.

Firstly in a step S701, the provider's access management server 110 determines what layout type the client user information table 2121 specifies.

Here the process is explained provided that there are three layout types "classification according to access frequency", "classification according to the types of addresses", and "change object image display according to access frequency."

If necessary, the layout types can be set by employing other criteria.

In the case of the layout type "classification according to access frequency", the flow of the control procedure follows the left-side branch so that the provider's access management server 110 executes a step S702.

In the step S702, the provider's access management server 110 divides the display area into predetermined sections (P1 to Pi).

This display area is one which is finally displayed on the client terminal 151.

When considering the step S702 from the aspect of the creation of the to-be-displayed contents based on the structured document data, the step S702 is the procedure of creating a statement in each description language data so that the aforementioned sections (P1 to Pi) are displayed in accordance with the statement.

Then the provider's access management server 110 goes to a step S703, in which the provider's access management server 110 classifies the addresses which have been accessed in the past by the user into groups of the same number as "i".

For example, let it be assumed that the addresses A1 to A6 which have been accessed in the past by the user have access frequencies 1, 2, 3, 4, 5 and 6, respectively.

In the above case, the highest access frequency 6 is divided by 4 (the result is 1.5). An address whose access frequency is 1.5 or less is grouped with the section P1, an address whose access frequency is higher than 1.5 but is not higher than 3.0 is grouped with the section P2, an address whose access frequency is higher than 3.0 but is not higher than 4.5 is grouped with the section P3, and an address whose access frequency is higher than 4.5 but is not higher than 6.0 is grouped with the section P4.

In consequence, one address having the access frequency 1 belongs to the section P1, two addresses having the access frequencies 2 and 3 belong to the section P2, one address having the access frequency 4 belongs to the section P3, and two addresses having the access frequencies 5 and 6 belong to the section P4.

Needless to say, the "classification according to access frequency" is not limited to the above-described linear classification, and other various ways of classification can be adopted.

In the next step S704, the provider's access management server 110 determines the display format according to the specs of the client terminal 151, based on the individual items stored in the column "terminal spec" of the client user information table 2121.

The display format is one of, for example, VRML format, HTML 1 format, HTML 2 format and HTML 3 format which will be explained later.

The provider's access management server 110 need not determine the display format each time the map data is updated as in the case of this example, and can determine the display format at a predetermined timing and store the result of the determination in the client user information table 2121 or the like.

In a step S705, the provider's access management server 110 assigns the addresses classified in the step S703 to their corresponding sections, in accordance with the display format determined in the step S704.

When considering the step S704 from the aspect of the creation of the to-be-displayed contents based on the structured document data, the step S704 is the procedure of designating the layout of the object images corresponding to the addresses grouped with the sections (P1 to Pi), in accordance with the statement created in each description language, so that the object images are arranged and displayed in the sections.

The object images are those acquired from the object image table 124, and are used in the case of performing display based on HTML, for example.

In the case of performing display based on VRML, the coordinates data, etc. (not illustrated) which define the stereoscopic or three-dimensional representation of a display image are acquired from the object image table 124, and the designation according to VRML is performed based on the acquired data.

By the procedures in the steps S702 to S705, the map data as a map in which the object images have been classified according to access frequency, is created.

This map data is the data described in HTML or VRML. The map data is sent to the client terminal 151 and is analyzed by the WWW browsers or the VRML viewer, after which the map which substitutes for bookmarks and address books is displayed on the client terminal 151.

When the provider's access management server 110 determines in the step S701 that the layout type is "classification according to the types of addresses", it goes the central branch to execute a step S706.

In the step S706, the provider's access management server 110 divides the display area into predetermined sections (P1 to Pj), as in the case of the step S702.

In the next step S707, the provider's access management server 110 classifies the addresses which have been accessed in the past by the user into groups, according to type and subtype.

As described previously, the types and subtypes of the addresses can be acquired from the yellow page table 123.

The types and subtypes thus acquired are allotted to the sections P1 and Pj.

The number of sections and the method of allotting the types and subtypes to the sections are arbitrary. For example, only the types may be allotted one to each of the sections, or combinations of the types and subtypes may be allotted one to each of the sections.

In the next step S708, the provider's access management server determines the display format according to the terminal specs of the client terminal 151 or 152, based on the individual items stored in the column "terminal spec" of the client user information table 2121.

In the next step S709, the provider's access management server 110 assigns the addresses classified in the step S707 to their corresponding sections, in accordance with the display format determined in the step S708.

When considering the step S709 from the aspect of the creation of the to-be-displayed contents based on the structured document data, the step S709 is the procedure of designating the layout of the object images corresponding to the addresses grouped with the sections (P1 to Pj), in accordance with the statement created in each description language, so that the object images are arranged and displayed in the sections.

The object images a re those acquired from the object image table 124, and are used in the case of performing display based on HTML, for example.

In the case of performing display based on VRML, the coordinates data, etc. (not illustrated) which define the stereoscopic or three-dimensional representation of a display image are acquired from the object image table 124, and the designation according to VRML is performed based on the acquired data.

By the procedures in the steps S706 to S709, the map data as a map in which the object images have been classified according to the types of the addresses, is created.

This map data is the data written in HTML or VRML, as mentioned previously.

When the provider's access management server 110 determines in the step S701 that the layout type is "change object image display according to access frequency", it goes the right-side branch to execute a step S710.

In the step S710, the provider's access management server 110 classifies the addresses which have been addressed in the past by the user into groups of a predetermined number K.

In the next step S711, the provider's access management server 110 determines the display format according to the terminal specs of the client terminal 151, based on the individual items stored in the column "terminal spec" of the client user information table 2121.

In the next step S712, in accordance with the display format determined in the step S708, the provider's access management server 110 changes the sizes, colors, orientations and other features in appearance of the object images corresponding to the addresses, by a plurality of levels or stages of the same number as the number (K) of groups into which the addresses have been classified. The provider's access management server 110 may change object image display not by the plurality of levels or stages (of the number K), but in proportion to access frequency.

An explanation will now be made to an example in which the higher access frequency an address has, the larger the corresponding object image is, and the more closer to the user the object image is displayed (the lower position in the display area the object image is displayed in).

When considering the step S712 from the aspect of the creation of the to-be-displayed contents based on the structured document data, the step S712 is the procedure of designating the sizes and layout positions of the object images, based on each description language and depending on the number K.

The object images are those acquired from the object image table 124, and are used in the case of performing display based on HTML, for example.

In the case of performing display based on VRML, the coordinates data, etc. (not illustrated) which define the stereoscopic or three-dimensional representation of a display image are acquired from the object image table 124, and the designation according to VRML is performed based on the acquired data.

By the procedures in the steps S710 to S712, the map data as a map in which the sizes of the object images have been changed according to access frequency, is created.

This map data is the data written in HTML or VRML, as mentioned previously.

Figure 34:
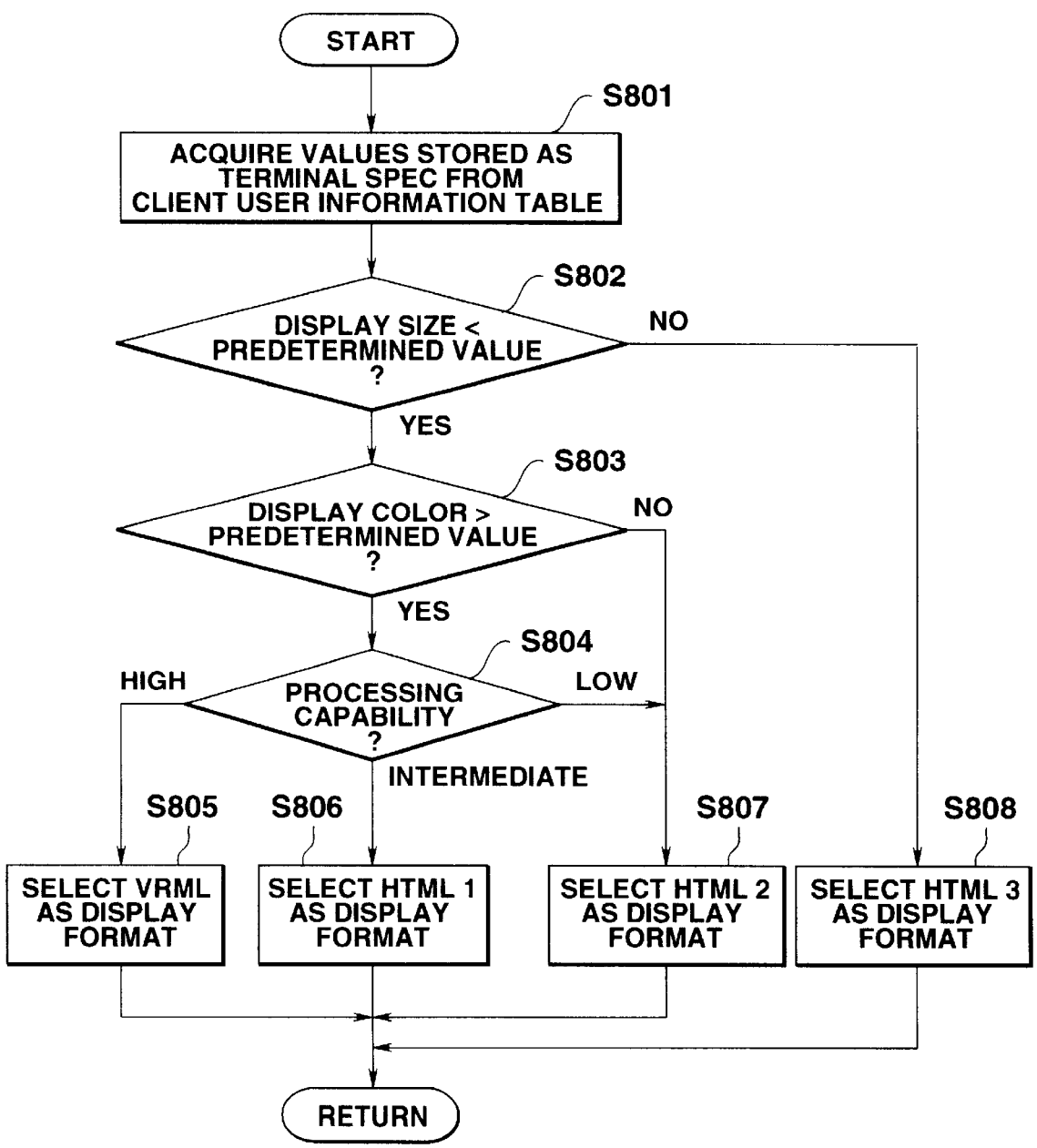
FIG. 34 is a flowchart showing display format determining steps.

FIG. 34 explains in more detail the display format determining steps S704, S708 and S711 shown in FIG. 33.

The steps S704, S708 and S711, which are the same as each other, are executed upon calling the process shown in FIG. 33 by a subroutine call, etc. In each of the aforementioned determining steps shown in FIG. 33, one of the following formats is determined as the format of the map:

(1) VRML Format

Employing VRML, the map is provided to the client terminal 151.

In the case of VRML, the amount of data to be transferred to the client terminal 151 and the required memory resource are large and also a high degree of processing capability is necessary, in order to display a virtual space in real time in response to a user's instruction.

Furthermore, a large number of display dots and a large number of display colors are required of the display device.

(2) HTML 1 Format (Map+Object Image)

According to HTML 1 format, the addresses accessed in the past by the user are expressed in object images (image metaphor) by employing HTML.

The amount of data to be transferred to the client terminal 151 and the required memory resource are not as large as in the case of VRML. However, since the object images are dealt with in the case of the HTML 1 format, the memory resource which is large to some extent and a high degree of processing capability are required.

(3) HTML 2 Format (Map+Text)

This format employs text-style data like the titles of pages, in place of the object images employed in HTML 1 format explained in the preceding paragraphs (2).

Since no object images are dealt with in the case of HTML 2 format, a large memory resource and a high degree of processing capability are not required accordingly.

(4) HTML 3 Format (Text Only)

A map-like arrangement of addresses, realized with the formats explained in the above paragraphs (1) to (3), is not adopted in the case of HTML 3 format. Instead, pieces of information containing texts like the titles of pages are hierarchically arranged in the form of a list.

Since HTML 3 format is text-based, a load on the client terminal 151 is light, and therefore HTML 3 format can be realized even by a display device whose specifications are relatively old.

In this example, languages such as HTML and VRML are adopted. However, any other language or method can also be adopted insofar as the function of anchoring to WWW pages, etc. can be realized.

Firstly in a step S801, the provider's access management server 110 acquires the values stored in the column "terminal spec" in association with the client terminal 151 of the user.

In the next step S802, the provider's access management server 110 determines whether the display size acquired from the column "terminal spec" is greater than a predetermined value.

When the display size is not greater than the predetermined value ("No" in the step S802), the provider's access management server 110 selects HTML 3 as the display format in a step S808.

When the display size is greater than the predetermined value ("Yes" in the step S802), the provider's access management server 110 further determines in a step S803 whether the number of colors specified in the column "display color" is larger than a predetermined value.

When the number of colors is not larger than the predetermined value ("No" in the step S803), the provider's access management server 110 selects HTML 2 as the display format in a step S807.

When the number of colors is larger than the predetermined value "Yes" in the step S803), the provider's access management server 110 further determines the degree of the processing capability in a step S804.

When the provider's access management server 110 determines that the degree of the processing capability is high, it selects VRML as the display format in a step S805.

When the provider's access management server 110 determines that the degree of the processing capability is intermediate, it selects HTML 1 s the display format in a step S806.

When the provider's access management server 110 determines that the degree of the processing capability is low, it selects HTML 2 as the display format in a step S807.

The aforementioned processing capability is a value evaluated from, for example, the individual items such as "CPU", "memory", "line", etc. stored in the column "terminal spec" in association with the client terminal 151. Various formulas for the evaluation are available. The flow of the determining process shown in FIG. 34 is merely an example, and a large number of variations are also available.

In the above-described manner, the provider's access management server 110 automatically determines the display format to be sent to the client terminal 151, in accordance with the flow shown in FIG. 34. However, the provider's access management server 110 can be set so as to provide a specific fixed display format to the client terminal 151, without performing the automatic determination.

This is because some users may desire to make their client terminals employ a specific heavy-load display format even though the use of the display format results in a heavy load being placed on the client terminals, while some users may desire to make their client terminals employ a light-load display format even through the client terminals have satisfactorily large memory capacities.

In the above-described case, an area for designating a display format such as VRML, HTML 1, HTML 2, HTML 3 or the like can be added to the client user information table 2121, and a flag representing whether to use the display format specified in the area or the display format determined automatically can be adopted.

FIGS. 13, 14, 16, 17, 35 and 36 illustrates examples of the map displayed on the client terminal 151.

FIG. 13 exemplifies the map displayed when the layout type shown in the client user information table 2121 is "classification according to the types of addresses" and when the display format determined based on the individual items stored in the column "terminal spec" of the client user information table 2121 is VRML. The contents of the map are the same as those of the first embodiment.

FIG. 14 exemplifies the map displayed when the layout type shown in the client user information table 2121 is "classification according to access frequency" and when the display format determined based on the individual items stored in the column "terminal spec" of the client user information table 2121 is VRML. The contents of the map are the same as those of the first embodiment.

FIG. 16 exemplifies the map displayed when the layout type shown in the client user information table 2121 is "change object image display according to access frequency" and when the display format determined based on the individual items stored in the column "terminal spec" of the client user information table 2121 is VRML. The contents of the map are the same as those of the first embodiment.

Figure 35:
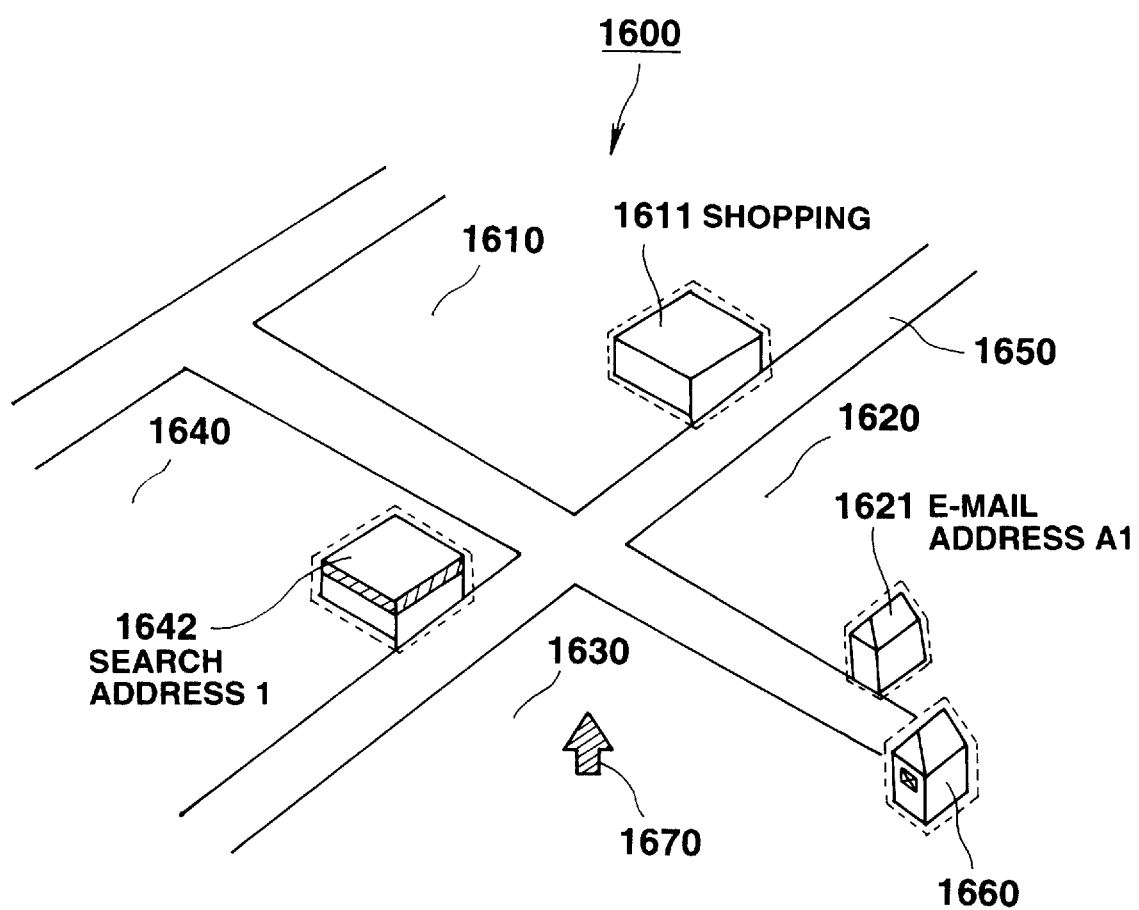
FIG. 35 is a diagram illustrating an example of a map which is displayed in the case of layout type "classification according to the types of addresses" and display format HTML1.

FIG. 35 exemplifies the map displayed when the layout type shown in the client user information table 2121 is "classification according to the types of addresses" and when the display format determined based on the individual items stored in the column "terminal spec" of the client user information table 2121 is HTML 1.

The displayed map 1600 illustrated in FIG. 35 has four main sections 1610, 1620, 1630 and 1640, a road 1650 between those sections, and a home 1660 representing an user address.

The section 1610, which has been set as one for addresses associated with shopping, displays an object image 1611 which represents a certain shopping page.

The section 1620, which has been set as one for e-mail addresses, displays an object image 1621 which corresponds to an e-mail address A1.

The section 1630 is blank and displays no object image.

The section 1640, which has been designed as one for search addresses, displays an object image which corresponds to a search address 1.

The map 1600 is based on HTML, and the object images displayed in the sections 1610, 1620 and 1640 utilize clickable map specifications.

The map 1600 based on HTML is a two-dimensional representation in which avatars like those shown in FIGS. 13, 14 and 16 are not present, and the points from which the object images are viewed are fixed. In FIGS. 13, 14 and 16, an address is selected by making the avatar arrive the object image corresponding to the address. In FIG. 35, however, an address is selected by clicking on the image data corresponding to the address with a designation pointer 1670 or the like.

Figure 36:
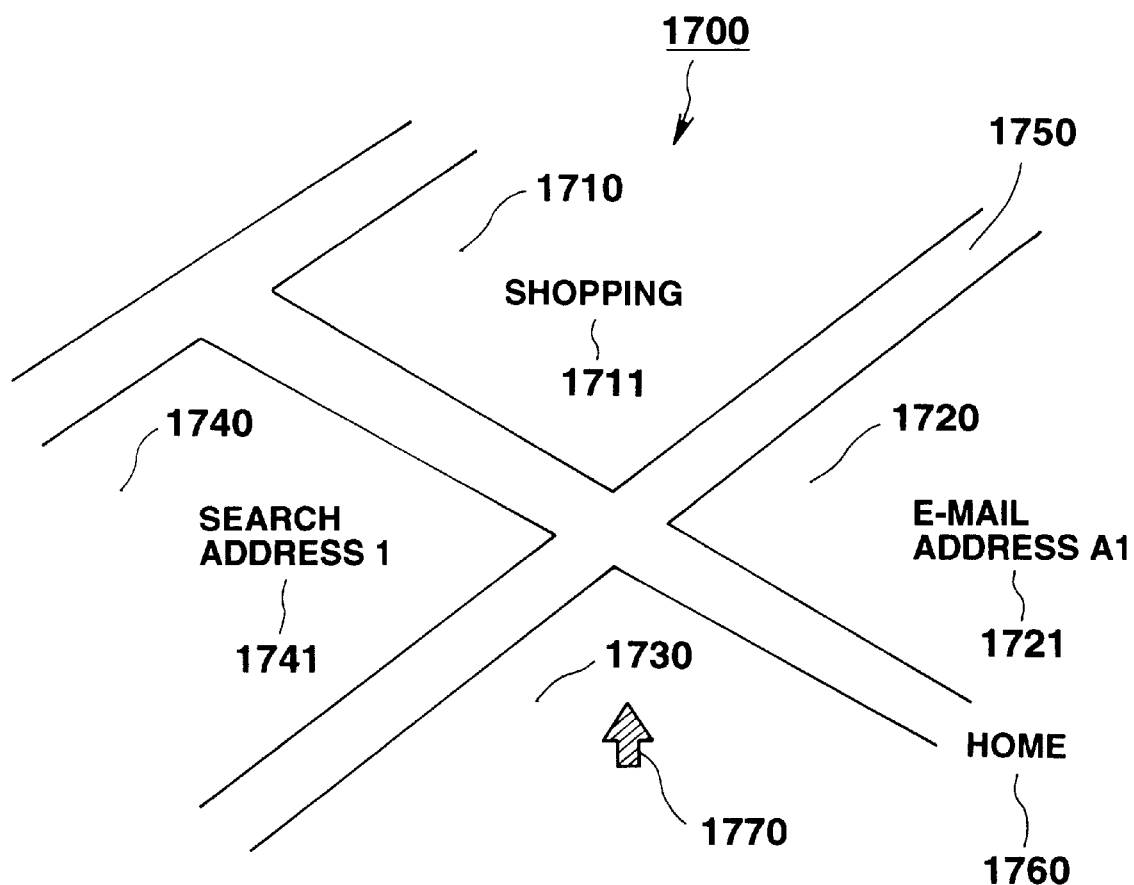
FIG. 36 is a diagram illustrating an example of a map which is displayed in the case of layout type "classification according to the types of addresses" and display format HTML2.

FIG. 36 exemplifies the map displayed when the layout type shown in the client user information table 2121 is "classification according to the types of addresses" and when the display format determined based on the individual items stored in the column "terminal spec" of the client user information table 2121 is HTML 2. The displayed map 1700 illustrated in FIG. 36 is a text-based map in which HTML object images are displayed in the form of texts.

The map 1700 illustrated in FIG. 36 has four main sections 1710, 1720, 1730 and 1740, a road 1750 between those sections, and a home 1760 representing an user address.

The section 1710, which has been set as one for addresses associated with shopping, displays a text "shopping" 1711 with a link to a certain shopping page.

The section 1720, which has been set as one for e-mail addresses, displays a text "e-mail address A1" 1721 which corresponds to an e-mail address A1.

The section 1730 is blank and displays no text.

The section 1740, which has been designed as one for search addresses, displays a text "search address 1" which corresponds to a search address 1.

The map 1700 is based on HTML and the texts displayed in the sections 1710, 1720 and 1740 have basically HTML links.

By clicking with the designation pointer 1770 or the like on the texts, the user can access the corresponding addresses.

FIG. 18 exemplifies the map displayed when the layout type shown in the client user information table 2121 is "classification according to the types of addresses" and when the display format determined based on the individual items stored in the column "terminal spec" of the client user information table 2121 is HTML 3. The contents of the map are the same as those of the first embodiment.

The embodiment shown in FIG. 18, wherein texts are displayed as a list, is advantageous as regards the point that the screen display can be performed quickly when the processing capability, resolution, data rate, etc. of the client terminals are not satisfactory.

The number of symbols (each symbol corresponding to an address) displayed in the map (map information) of the present invention can be set at the optimum value according to the processing capability of the client terminals which are utilized by the users and the performance of the display devices.

In order to reduce the total amount of map data, the aforementioned symbols can also be designed so as to be simpler than object images such as those illustrated in FIGS. 9A and 9B, in accordance with the performances of the computers and the display devices which are utilized by the users.

The programs and data, which control conventional computers to operate as the network-access management system 100, may be stored in recording mediums such as FDs, MOs and CD-ROMs, and the mediums maybe distributed. In this case, the programs are installed in the computers to form the system 100. Further the programs and data may be embedded in carrier waves and may be transferred to computers through a network.

What is claimed is:

1. A network-access management system which connects at least one client terminal and a network having information resources, and which performs information transmissions between said at least one client terminal and said network, said system comprising:

storage means for storing addresses of information pieces which said at least one client terminal has previously accessed;

analyzing means for analyzing attributes of the addresses stored in said storage means;

creating means for creating display data which reflects a result of the analysis performed by said analyzing means;

sending means for sending the display data created by said creating means to said at least one client terminal;

accessing means for periodically accessing the addresses stored in said storage means;

determining means for determining statuses of the information pieces identified by said addresses which said accessing means has accessed; and altering means for altering said display data in accordance with a result of the determination performed by said determining means.

2. The network-access management system according to claim 1, further comprising:

additional storage means for storing, in association with each other, said statuses and three-dimensional images which are characterizations of contents of said statuses; and means for reading out the images stored in said additional storage means, based on said statuses, and for pasting the readout images into said display data.

3. A network-access management system which connects at least one client terminal and a network having information resources, and which performs information transmissions between said at least one client terminal and said network, said system comprising:

storage means for storing addresses of information pieces which said at least one client terminal has previously accessed;

analyzing means for analyzing attributes of the addresses stored in said storage means;

creating means for creating display data which reflects a result of the analysis performed by said analyzing means;

sending means for sending the display data created by said creating means to said at least one client terminal;

accessing means for periodically accessing the addresses stored in said storage means;

determining means for determining statuses of said network which permit said accessing means to access said addresses; and altering means for altering said display data in accordance with a result of the determination performed by said determining means.

4. The network-access management system according to claim 3, further comprising:

additional storage means for storing, in association with each other, said statuses and three-dimensional images which are characterizations of contents of said statuses; and means for reading out the images stored in said additional storage means, based on said statuses, and for pasting the readout images into said display data.

5. A network-access management system which connects at least one client terminal and a network having information resources, and which performs information transmissions between said at least one client terminal and said network, said system comprising:

storage means for storing addresses of information pieces which said at least one client terminal has previously accessed;

analyzing means for analyzing attributes of the addresses stored in said storage means;

creating means for creating display data which reflects a result of the analysis performed by said analyzing means;

sending means for sending the display data created by said creating means to said at least one client terminal;

additional storage means for storing information on at least a display performance of said at least one client terminal; and altering means for altering said display data, based on said information stored in said additional storage means, when said display data is sent to said at least one client terminal.

6. A network-access management method for dealing with information transmissions between at least one client terminal and a network having information resources, said method comprising:

storing addresses of information pieces which said at least one client terminal has previously accessed;

analyzing attributes of the addresses;

creating display data to be displayed on said at least one client terminal, in accordance with a result of the analysis;

sending the created display data to said at least one client terminal;

periodically accessing the stored addresses;

determining statuses of the information pieces identified by the accessed addresses; and altering the display data to be sent to said at least one client terminal, in accordance with a result of the determined statuses.

7. A network-access management method for dealing with information transmissions between at least one client terminal and a network having information resources, said method comprising:

storing addresses of information pieces which said at least one client terminal has previously accessed;

analyzing attributes of the addresses;

creating display data to be displayed on said at least one client terminal, in accordance with a result of the analysis;

sending the created display data to said at least one client terminal;

periodically accessing the stored addresses;

determining statuses of said network which permit access to said addresses; and altering the display data to be sent to said at least one client terminal, in accordance with a result of the determined statuses.

8. A network-access management method for dealing with information transmissions between at least one client terminal and a network having information resources, said method comprising:

storing addresses of information pieces which said at least one client terminal has previously accessed;

analyzing attributes of the stored addresses;

creating display data which reflects a result of the analysis;

sending the created display data to said at least one client terminal;

storing information on at least a display performance of said at least one client terminal; and altering said display data, based on said stored information, when said display data is sent to said at least one client terminal.

9. A computer program for achieving a network-access management system which connects at least one client terminal and a network having information resources, and which performs information transmissions between said at least one client terminal and said network, said computer program comprising code means for causing a computer to execute operations of:

storing addresses of information pieces which said at least one client terminal has previously accessed;

analyzing attributes of the stored addresses;

creating display data which reflects a result of the analysis;

sending the created display data to said at least one client terminal;

periodically accessing the stored addresses;

determining statuses of the information pieces identified by the accessed addresses; and altering the display data in accordance with a result of the determined statuses.

10. The computer program according to claim 9, wherein said computer program is stored on a recording medium.

11. The computer program according to claim 9, wherein said computer program comprises a data signal embodied in a carrier wave.

12. A computer program for achieving a network-access management system which connects at least one client terminal and a network having information resources, and which performs information transmissions between said at least one client terminal and said network, said computer program comprising code means for causing a computer to execute operations of:

storing addresses of information pieces which said at least one client terminal has previously accessed;

analyzing attributes of the stored addresses;

creating display data which reflects a result of the analysis;

sending the created display data to said at least one client terminal;

periodically accessing the stored addresses;

determining statuses of said network which permit access said addresses; and altering said display data in accordance with a result of the determined statuses.

13. The computer program according to claim 12, wherein said computer program is stored on a recording medium.

14. The computer program according to claim 12, wherein said computer program comprises a data signal embodied in a carrier wave.

15. A computer program for achieving a network-access management system which connects at least one client terminal and a network having information resources, and which performs information transmissions between said at least one client terminal and said network, said computer program comprising code means for causing a computer to execute operations of:

storing addresses of information pieces which said at least one client terminal has previously accessed;

analyzing attributes of the stored addresses;

creating display data which reflects a result of the analysis;

sending the created display data to said at least one client terminal;

storing information on at least a display performance of said at least one client terminal; and altering said display data, based on said stored information, when said display data is sent to said at least one client terminal.

16. The computer program according to claim 15, wherein said computer program is stored on a recording medium.

17. The computer program according to claim 15, wherein said computer program comprises a data signal embodied in a carrier wave.

* * * * *